United States Patent
Sano et al.

(10) Patent No.: US 7,461,394 B1
(45) Date of Patent: Dec. 2, 2008

(54) INFORMATION PROCESSING APPARATUS CONNECTED TO HOME TV SET IN USE

(75) Inventors: Koichi Sano, Kusatsu (JP); Shuhei Kato, Kusatsu (JP)

(73) Assignee: SSD Company, Shiga (JP)

( * ) Notice: Subject to any disclaimer, the term of this patent is extended or adjusted under 35 U.S.C. 154(b) by 0 days.

(21) Appl. No.: 09/473,963

(22) Filed: Dec. 29, 1999

(30) Foreign Application Priority Data

Dec. 30, 1998 (JP) .................................. 10-377109

(51) Int. Cl.
H04N 7/16 (2006.01)
G06F 17/00 (2006.01)
G06F 19/00 (2006.01)
A63F 9/24 (2006.01)
A63F 13/00 (2006.01)

(52) U.S. Cl. .......................... 725/153; 725/140; 463/3
(58) Field of Classification Search ................ 725/153, 725/109, 133, 140; 463/1, 3, 4, 31
See application file for complete search history.

(56) References Cited

U.S. PATENT DOCUMENTS

| | | | | |
|---|---|---|---|---|
| 5,532,923 | A * | 7/1996 | Sone | 700/9 |
| 5,634,848 | A * | 6/1997 | Tsuda | 463/25 |
| 6,227,973 | B1 * | 5/2001 | Kikuchi | 463/31 |
| 6,227,974 | B1 * | 5/2001 | Eilat | 463/40 |

FOREIGN PATENT DOCUMENTS

| | | |
|---|---|---|
| JP | 06-012246 | 1/1994 |
| JP | 10-214155 | 11/1998 |

OTHER PUBLICATIONS

Incredible Technologies, Golden Tee Golf Press Releases, Jul. 12, 1998, http://web.archive.org/web/19980712220233/http://itsgames.com/, http://web.archive.org/web/19980712221726/itsgames.com/ITS/OperatorInfo/articles/GeneralQuestions.htm.*
http://web.archive.org/web/19980712221733/itsgames.com/ITS/OperatorInfo/articles/TechnicalQuestions.htm.*
Japanese Notice of Reason for Rejection dated Jul. 12, 2005.
Japanese Final Rejection dated Sep. 27, 2005.
K. Awazu et al., "Visio Connect" Living Room Personal Computer wit DVD, 1997, vol. 52(8):63-66.

* cited by examiner

*Primary Examiner*—Hunter B. Lonsberry
(74) *Attorney, Agent, or Firm*—Arent Fox LLP

(57) ABSTRACT

An information processing apparatus includes man-machine interface, a semiconductor memory and an information processor. The semiconductor memory is configured by an application software contents portion, an application software engine, an operating system, an information processor hardware driver and a man-machine interface driver. Clear definition is given to interfaces between modules including software and hardware.

8 Claims, 30 Drawing Sheets

INFORMATION PROCESSING APPARATUS CONNECTED TO HOME TV SET IN USE

BACKGROUND OF THE INVENTION

1. Field of the Invention

This invention relates to an information processing apparatus usable by connecting to a home TV set. More particularly, the invention relates to an information processing apparatus which is, while for use as a TV game set, communication network information appliance, communication karaoke set, car navigator, intellectual training toy, word processor, practical information furnisher, on-production-line inspection device, measuring instrument or the like, to be used by connecting to a home TV set.

2. Description of the Prior Art

There is widespread of information processing apparatuses usable by connecting to a home TV set. These apparatuses include home TV sets, such as a Super Famicom (registered trademark) and Playstation (registered trademark).

The conventional home TV game machines have adopted a soft-and-hard separation type system wherein the main body is connected to a TV set while exclusive software for the home TV game machine can be supplied in a ROM cassette or CD-ROM form.

Meanwhile, there also are information processing apparatuses of a soft-and-hard integration type, in contrast to the soft-and-hard separation type of information processing apparatuses. These include, for example, soft-and-hard integration type TV game machines. This scheme has often been seen before the advent of the soft-and-hard separation type game machines.

However, these information processing apparatuses have involved the following problems in respect of use and development of software.

First of all, for the soft-and-hard separation type information processing apparatuses, the user must have possessed an information processing apparatus main body as a platform in advance of using software thereon.

This implies, for the software suppliers on one hand, that software sales never exceeds in number the platforms spread, i.e. sales population parameter is limited to those who possesses a platform.

Meanwhile, where the platform is for example a home TV game machine, the user would consider his or her platform as an exclusive TV game apparatus. This, however, results in difficulty for the user to accept, even if sold, such software other than of games as business-purpose software including stock price chart and various data base software and education software including English conversation training software. Meanwhile, the software distribution system today is relied upon that of hardware. Therefore, it is difficult to pursue distribution and sales of software other than of games on the basis of a game machine as a platform. Thus, the software supplier have undergone hindrance against free development and sale of software.

Furthermore, software basically must be developed adapted to a man-machine interface provided on a platform. It is however difficult to provide an optimal man-machine interface for software.

On the other hand, the soft-and-hard integration type information processing apparatuses is advantageous in that the sales population parameter is not limited in number to the platforms spread because they are sold in the form installed previously with software.

Turning now again to TV game machines of the soft-and-hard integration type for example, they are of an exclusive design including hardware. Many of them are configured only by a wired logic without employing a microprocessor.

That is, in the conventional soft-and-hard integration type TV game machine are installed with nothing more than simple software with using different hardware for each use. Due to this, there has been a need to make software modular for enabling reuse. However, such scheme could not cope with complicated ones of software.

In the meanwhile, the soft-and-hard separation type information processing apparatuses, in many cases, are provided with an operating system, device driver, basic input/output system and so on. This is due not only to enhancing the efficiency of software development but also to sustaining the interchangeability of software between different hardware systems. The application software developers need not to manufacture system modules by themselves but are required to self-prepare all part of the application software except for these.

SUMMARY OF THE INVENTION

It is therefore a primary object of the present invention to provide a novel information processing apparatus.

Another object of the invention is to provide an information processing apparatus to be connected, in use, to a home TV set (hereinafter may be described merely as "information processing apparatus) for which application software is easy to develop.

The present invention is an information processing apparatus for outputting video and audio signals to a home TV set, comprising a man-machine interface, a semiconductor memory and an information processor.

The man-machine interface converts into an electrical signal one or plurality of urging force, movement in a space, sound information that are given by a human to the man-machine interface.

The semiconductor memory stores software for driving the information processor. The software includes an operating system, an information processor hardware driver, a man-machine interface driver, an application software engine and application software contents portion.

The operating system administering at least status control of all the tasks included in the present software, task scheduling, shared resource control between tasks, and interrupt control.

The information processor hardware driver is to efficiently handle hardware resource in the information processor and includes a driver program and driver data. The driver program includes totally one or more tasks and subroutines, and is to be utilized in function according to task execution or a subroutine call from the application software engine. The driver data is a set of data to be handled by the driver program.

The man-machine interface driver is to efficiently deliver the electrical signal from the man-machine interface to the application software engine and includes totally one or more tasks and subroutines, and to be utilized in function according to task execution or a subroutine call from the application software engine.

The application software engine is to perform a process relied upon an application kind among regular processes required by the application software contents portion and includes totally one or more tasks and subroutines, and utilized in function task execution or subroutine call from an application software contents program. The application software contents portion is configured by an application software contents program and application software contents data. The application software contents program is a program code for a particular process to achieve an objective of the present information processing apparatus and including one or more tasks. The application software contents data is a set of data to be handled by the application software contents program or the application software engine.

The information processor performs an operation process based on an electrical signal from the man-machine interface and software stored in the semiconductor memory, and produce image information and sound information.

The present invention, first, has solved many problems involved in the information processing apparatuses of the soft-and-hard separation type by integrating software and hardware and a man-machine interface. That is, if purchasing an information processing apparatus of the invention, a utilizer can use software offered by the information processing apparatus without a necessity of separately purchasing a platform. Meanwhile, for the software suppliers, software sales is not limited by the number of platforms spread. Besides, they can develop software freely in genru. A suitable man-machine interface can be utilized without restriction by the software.

The invention, second, is characterized in that, in order to make modular software and hardware resources, clear definition is given to interfaces as boundaries between them.

That is, in the invention, as one example, a concept of an application software engine that has been conventionally unclear is newly introduced. This is made modular to perform a process dependent on a kind of an application among regular processes required by the application software. An interface between an application software contents portion as a program and/or data for a particular process to achieve an objective of the information processing apparatus and an application engine. This makes it possible to commonly utilize application software engine in developing a same kind of applications. It is therefore possible to reduce labor and time in development of application software.

Meanwhile, because the information processing apparatus according to the invention is to be used by connected to a home TV set, the apparatus has to output video and audio signals. Consequently, the information processing apparatus preferably has exclusive hardware a processor for producing image information and sound information. Also, if these processors are given a function to obtain data from a shared memory, the entire apparatus can be increased in processing speed and reduced in circuit scale. By putting the eye on the above, the present invention has adopted the following configuration to achieve this.

Specifically, in an embodiment of the invention, the information processor has a central processor, a graphics processor and a sound processor. The central processor, the graphic processor and the sound processor share a memory space in which the semiconductor memory is allocated. The central processor controls the graphics processor and the sound processor based on the electrical information from the man-machine interface and a program code in the software. The graphics processor has means to generate image information. The sound processor has means to generate sound information.

Meanwhile, the application software contents portion of the information processing apparatus of the invention can be configured by description in script language. Here, the script language refers to a language which is high in abstraction as compared to an object code directly interpretable by the information processor, and is easy in format and configuration for a human to understand. The software for the information processing apparatus in this case is configured by an operating system, an information processor hardware driver, a man-machine interface driver, a script language interpreter and an application software contents portion.

That is, in one aspect of the invention, an information processing apparatus comprises a man-machine interface, a semiconductor memory and an information processor. The man-machine interface converts into an electrical signal one or a plurality of urging force, in-space movement, sound information that are given by a human to the present man-machine interface. The semiconductor memory storing software for driving the information processor.

The software includes an operating system, an information processor hardware driver, a man-machine interface driver, a script language interpreter and an application software contents portion.

The operating system administers at least status control of all the tasks included in the present software, task scheduling, shared resource control between tasks, and interrupt control.

The information processor hardware driver is to efficiently handle a hardware resource in the information processor and configured by a driver program and driver data. The driver program includes totally one or more tasks and/or subroutines and being to be utilized in function according to task execution or subroutine call from the script language interpreter. The driver data being a set of data to be handled by the driver program.

The man-machine interface driver is to efficiently deliver the electrical information from the man-machine interface to the script language interpreter and including totally one or more tasks and subroutines, and utilized in function according to task execution or a subroutine call from the script language interpreter;

The script language interpreter is to sequentially interpret a script language source code to produce and execute an object code interpretable by the information processor;

The application software contents portion is configured by a script language source code and application software contents data. The script language source code being a program for a particular process to achieve an objective of the present information processing apparatus. The application software contents data being a set of data to be handled by the script language source code and/or the script language interpreter.

The information processor is to perform an operation process based on an electrical signal from the man-machine interface and the software stored in the semiconductor memory, and producing image information and sound information.

According to the present invention, first the information processing apparatus is configured by an integrated man-machine interface, software and hardware. Accordingly, software sales is not limited in number by spread of hardware. Also, an input device can be provided that is best suited for the software.

Also, because clear definition is given to the interfaces between the modules including software and hardware, application development is possible with efficiency and speediness. The application software engine as a concept newly introduced provides expectation for enhancing the efficiency in developing a same kind of applications.

Furthermore, the information processor hardware driver and the man-machine interface driver are to control only the hardware provided in the information processing apparatus (including man-machine interface). Accordingly, there is no need to provide a contrivance for keeping compatibility between different models or for installing a driver for a new apparatus. Besides, the information processor hardware driver and man-machine interface driver can be reduced in program size, nursing memory resource.

Furthermore, the use of a high-processor used in an embodiment makes possible to share the semiconductor memory without the necessity for each processor within the high-speed processor to have a large capacity of a local memory. This realizes an information processor with a small circuit scale, thus achieving cost and size reduction for the information processing apparatus.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
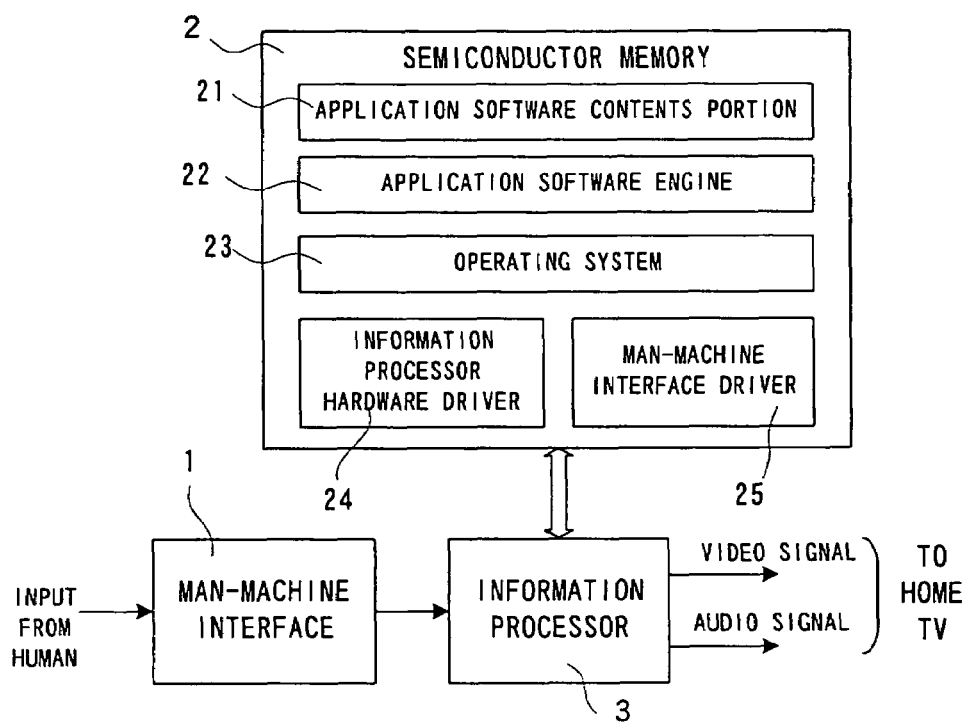
FIG. 1 is a block diagram showing one embodiment of the present invention.

Referring to FIG. 1, an information processing apparatus of this embodiment includes a man-machine interface 1, a semiconductor memory 2 and an information processor 3. The semiconductor memory 2 stores therein an application software contents portion (hereinafter may be briefly described as "contents portion") 21, an application software engine (hereinafter may be briefly described as "engine") 22, an operating system 23, an information processor hardware driver (hereinafter may be briefly described as "hardware driver") 24 and a man-machine interface driver (hereinafter may be briefly described as "interface driver") 25.

The man-machine interface 1 is to convert into an electrical signal or information one or a plurality of urging force, in-space movement and sound information that are applied to the man-machine interface by a human. The conversion of urging force into an electrical signal includes, for example, a key switch used on a keyboard or mouse and a tablet input portion, and so on. Similarly, the conversion of in-space movement into an electrical signal includes, for example, a mouse movement-detection portion, an acceleration detector, etc. Also, the conversion of sound information into an electrical signal includes, for example, a microphone, and so on.

Note that the man-machine interface 1 may have a plurality of identical ones of conversion means as on a keyboard, or a plurality of different conversion means as in the mouse. Furthermore, the man-machine interface may be configured by a plurality of different kinds of devices as where one apparatus has both a keyboard and a mouse, or by a plurality of devices of a same kind as in a case one apparatus has plurality of key pads.

Explanation will be made on a configuration of the man-machine interface 1 taking a mouse as an example. The mouse has means to detect movements in X-axis and Y-axis directions and respective amounts thereof, and a key switch. If the mouse is moved on a flat surface and the key is manipulated, then converted are directions and amounts of X- and Y-axis movements and a presence or absence of key operation into an electrical signal. The electrical signal is delivered to the information processor 3. The transmission means herein is not especially limited to but may adopt a variety of transmission means, including cable connection and infrared-ray communication. Where the electrical signal is required to be amplified/converted because of utilization in the information processor 3, the man-machine interface 1 may have means to amplify/convert the same signal.

The semiconductor memory 2 is to store software for driving the information processor 3. The semiconductor memory may be used, as required, a development area to run software at high speed or a software working area or for the purpose of temporarily saving an execution process or storing utilizer's information.

The suitable semiconductor memories include, in kind, a mask ROM, an EPROM, an EEPROM (including a flash memory) and various RAMs, such as an SRAM and a DRAM. These semiconductor memories have features suited for their respective application purposes, from which one should be selected to meet an application purpose of the information processor. For example, the mask ROM is suitable for use in a mass-produced information processor. The EPROM is preferably used in an information processor manufactured on a small-amount production basis and for application software development. The EEPROM is preferably used on an information processing apparatuses on a small-amount production basis and for application software development. Furthermore, the EPROM, electrically rewritable in content of memory, is suited for an information processing apparatus used to download programs and/or data through a telephone line, an information processing apparatus to rewrite and use software, and for utilizer's information storage. The RAM is used as a development area to run software at high speed and as a software working area, and for the purpose of temporarily storing an execution process and so on. The RAM, if combined with a battery, is suited for an information processing apparatus to rewrite and use software and for storing utilizer's information or a software execution status.

These memories may be used physically singular or a plurality in the number. The memories, where used in plurality, may be same in kind or different in kind. For example, when the application software is renewed or exchanged due to rewriting, it is satisfactory to renew or exchange only the contents portion 21. Accordingly, only the contents portion 21 can be stored on a flash memory while those not requiring change, such as the operating system 23, be stored in a mask ROM.

The semiconductor memory 2 stores, as shown in FIG. 1, a contents portion 21, an engine 22, an operating system 23, a hardware driver 24 and an interface driver 25, which modules have the following functions.

The contents portion 21 is configured by an application software contents program (hereinafter may be briefly described as "contents program") as a program code for a particular process to achieve an objective of the information processing apparatus, and application software contents data (hereinafter may be briefly described as "contents data") as a set of data to be dealt with by the contents program and/or engine.

In the case that the information processor herein is a baseball game apparatus, the objective of the information processor is to offer a baseball game as a TV game to a utilizer. The processing contents program in this example may include a game mode selection process and title display. Also, the contents data has a content including images of a pitcher, batter and runner or parameters for defining their abilities.

Besides the form configured by the contents program and the contents data, the contents portion 21 may be configured by only contents data or by a script language source code and contents data.

Where the contents portion 21 is configured only by data, the program for executing a particular processing for the application will be included in the engine 22. Note that a form wherein the contents portion 21 is configured by a script language program and data will be hereinafter described.

The engine 22 is to execute a process relied upon a kind of application among the regular processes required by the contents portion 21. Incidentally, the engine may be realized by wired logic hardware in place of realization with software to be executed on the processor. In particular, for an engine for repeatedly executing a same process, the realization on the hardware increase the speed of processing.

Figure 2:
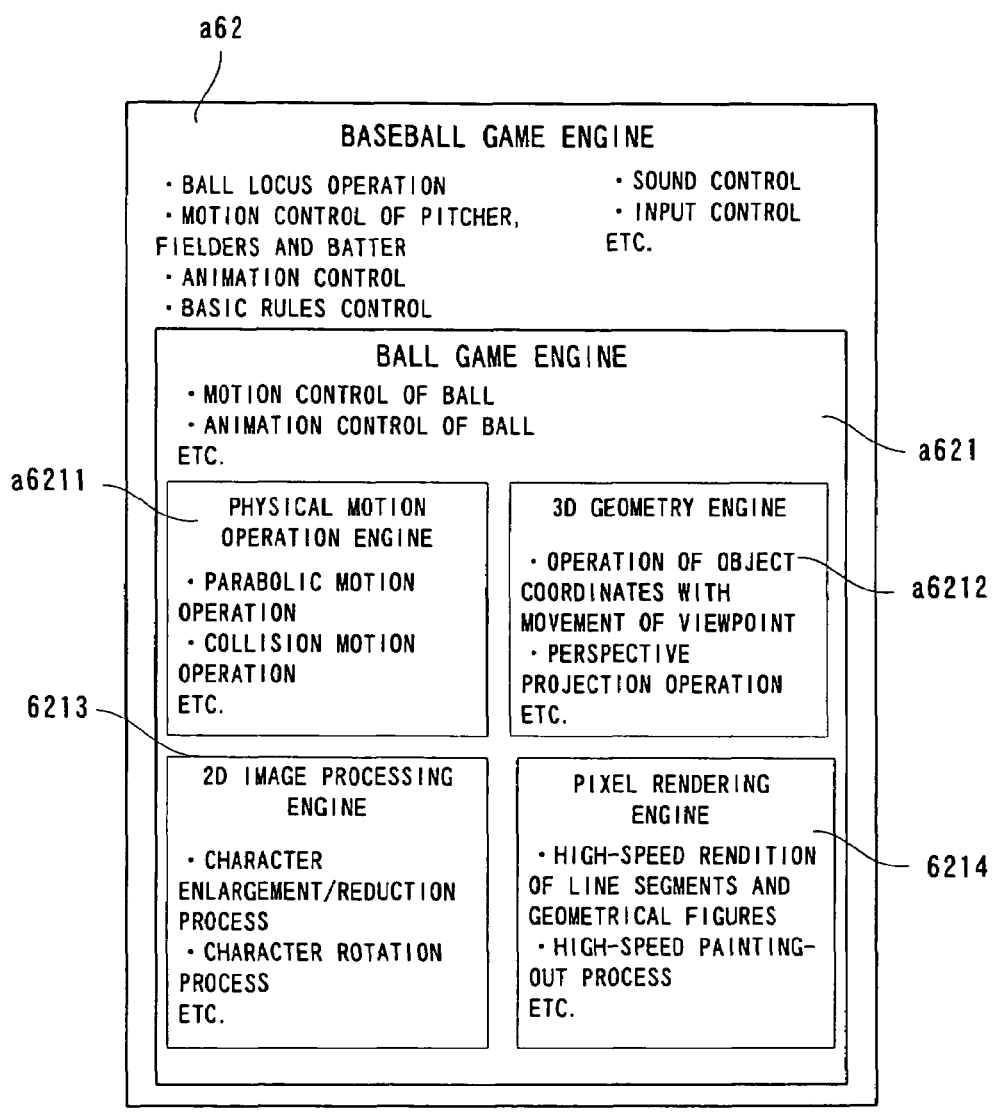
FIG. 2 is an illustrative view showing one example of an engine configuration of the FIG. 1 embodiment.

The engine 22 may be configured in a form further including a lower-level engine therein. FIG. 2 shows a concrete example of an engine 22 wherein a baseball game engine a62 is demonstrated in configuration that corresponds to an engine 22 for a baseball game apparatus hereinafter described.

The baseball game engine a62 includes therein a ball game engine a621. The ball game engine a621 further includes a physical motion operation engine a621, a 3D geometry engine a6212, a 2D image processing engine a6213 and a pixel rendering engine a6214.

The baseball game engine a62 administers a process required for a baseball game requiring three-dimensional image processing, as in an embodiment hereinafter described. The engine processing includes, concretely, ball locus arithmetic operation, motion control of a pitcher, fielder and batter, animation control, basic rule control, sound control and input control.

The ball game engine a621 administers such processing as movement control of sphere object in a three dimensional space. The ball game engine a621 is usable also for other ball games, such as table tennis, golf, soccer or the like. The processing of this engine includes, concretely, sphere object movement control, sphere object animation control, etc.

The physical motion operation engine a6211 administers coordinate operation of an object moving in three dimensional space. Specifically, a locus of object motion is operationally determined by providing such information as an object initial velocity and direction, a presence or absence of collision, and so on. The processing of this engine includes, concretely, parabolic motion operation, collision motion operation, and so on.

The 3D geometry engine 6212 is to operate as to how an object in three dimensional space is displayed in a two dimensional scene. The processing of this engine includes, concretely, coordinate operation of an object with respect to a moving view point, perspective projection operation, and so on.

The 2D image processing engine a6213 is to operate on enlargement/reduction/rotation/deformation of two-dimensional image data. The processing of this engine includes, concretely, character enlargement/reduction, character rotation, and so on.

The pixel rendering engine a6214 administers rendering of pixels onto the memory. The processing of this engine includes, concretely, high speed rendering of line segments and geometrical figures, high-speed painting out, and so on.

The operating system 23 administers at least status control of all the tasks included in this software, task scheduling, shared resource management between tasks and interrupt control. The algorithm for task scheduling is not especially limited but may use any of an arrival-order algorithm, priority-order algorithm and a round robin method. The method for shared resource management between tasks includes a technique using semaphore. The operating system 23 preferably administers information processor start-up and initial setting. Furthermore, the operating system may have such a function as memory management, virtual memory system, input/output control, file management and user interface (command line interface, GUI, etc.) offering.

The hardware driver 24 is to efficiently control the hardware (graphics processor, sound processor, DMA controller and the like) provided inside the information processor 3. The hardware driver also has a function to abstract hardware to provide a higher-functioning function block to a higher-level software module, such as the engine 22. These functions make it possible for the higher-level software module (contents portion 21, engine 22, operating system 23) to handle even different ones of hardware as a same functional block by merely changing the hardware driver 24.

The interface driver 25 is to process an input signals given through the man-machine interface 1. Also, the abstraction of a man-machine interface as seen from a higher level software module (contents portion 21, engine 22, operating system 23) makes it possible to handle as a same kind of man-machine interface realized by different ones of hardware. Also, the interface driver not only accepts an input from a human but also administers outputting of a man-machine interface 1 adapted to output vibration or sound toward a human.

The information processor 3 performs an operation processing based on an electrical signal given from the man-machine interface 1 and the software stored in the semiconductor memory 2, thereby creating video and audio information. The information processor 3 may be realized by one microprocessor, or individual processors may respectively administer video and sound processing.

Figure 3:
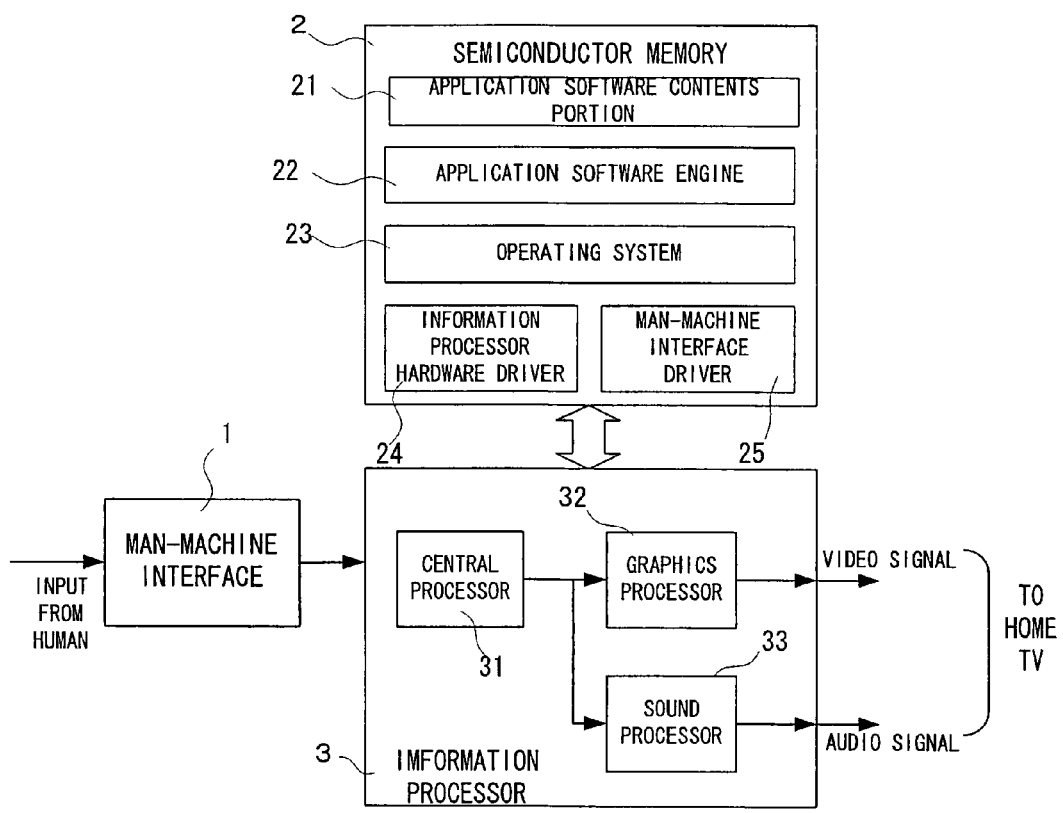
FIG. 3 is a block diagram showing another embodiment of the invention.

FIG. 3 shows another embodiment different from FIG. 1 in that an information processor 3 is configured by a central processor 31, a graphics processor 32 and a sound processor 33.

In the information processor 3 of this embodiment, the central processor 31, the graphics processor 32 and the sound processor 33 share a memory space. It is preferred that a semiconductor memory 2 is allocated within the shared memory space.

With such configuration of the information processor 3, the semiconductor memory 2 is efficiently shared by the respective processors. Accordingly, these processors are not required to have a great capacity of a local memory. Due to this, the information processor 3 can be configured with a small circuit scale, thus realizing reduction of cost and size for the information processor at the same time. It is accordingly possible to arrange a semiconductor memory 2 and an information processor 3 within a device accommodating a man-machine interface 1, e.g. a mouse (hereinafter may be briefly described as "man-machine interface device").

The central processor 31 controls the graphics processor 32 and sound processor 33 based on electrical information or signal outputted from the man-machine interface 1 and a program code of the software. The graphics processor 32 produces video information based on image data or the like contained in the software. The sound processor 33 produces sound information based on sound data or the like contained in the software.

Incidentally, the video and sound information to be produced by the above two processors may be respectively the same as those of the video and audio signals to be outputted from the information processor onto the home TV apparatus. Also, where the video and sound information produced by the two processors are not the same as such video signal and audio signal, the information processing apparatus further includes a conversion means of from video information to video signal (not shown) and conversion means of from audio information to audio signal (not shown). For example, where an RGB signal is outputted as video information from the graphics processor 32, the information processing apparatus has a conversion means of from an RGB signal to video signal.

Incidentally, the information processor 3 is preferably configured using a high-speed processor as disclosed in Japanese Patent Laid-open No. H10-307790 (corresponding U.S. patent Ser. No. 09/019,277).

Also, the graphics processor 32 is preferably configured using a scanning image producing circuit means as disclosed in Japanese Patent Laid-open No. H10-222151 (corresponding U.S. patent Ser. No. 09/019,260).

Also, the conversion means of from a video information to video signal, or part of the graphics processor 32, preferably uses a color video encoder as disclosed in Japanese Patent Laid-open No. H10-301552 (corresponding U.S. patent Ser. No. 09/344,636).

Figure 4:
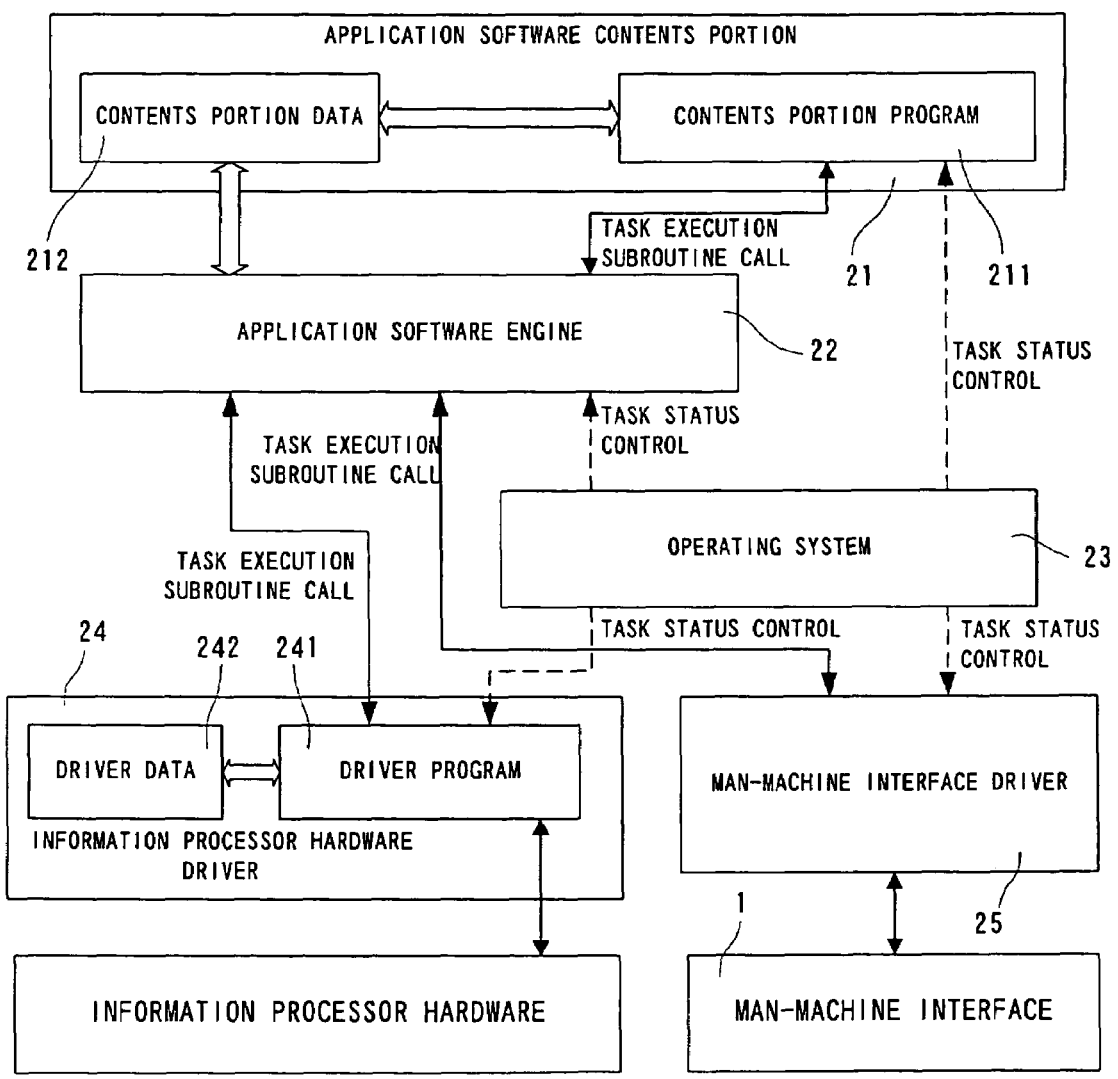
FIG. 4 is a function block diagram showing a software and hardware module configuration of the information processing apparatus of the embodiment.

FIG. 4 is a function block diagram showing a modular configuration in software and hardware of the information processing apparatus of the present embodiment. Note that in FIG. 4 and the subsequent the blanked arrow represents data access while the arrow denotes transmission of a control signal or the like.

In FIG. 4, a contents portion 21 is configured by a contents program 211 and contents data 212. Also, a hardware driver 24 is configured by a driver program 241 and driver data 242.

The contents program 211 is a program code for executing a particular processing to achieve an objective of the information processing apparatus, which includes one or more tasks. The contents data 212 is a set of data to be processed by the contents program 211 or engine 22.

The driver program 241 includes totally one or more tasks and subroutines, and is to be utilized in function according to a task execution or subroutine call from the engine 22. The driver data 242 is a set of data to be handled by the driver program 241.

In the information processing apparatus, every task is controlled of status by the operating system 23. That is, all the task states on the contents program 211, engine 22, driver program 241 and man-machine interface driver 25 are under control of the operating system 23.

The contents program 211 makes access, as required, to the data inside the contents data 212. Also, the contents program utilizes a function offered by the engine 22 through a subroutine call or task creation.

The engine 22 makes access, as required, to the data inside the contents data 212. Also, the engine utilizes a function offered by the driver program 241 or interface driver 25 through a subroutine call or task creation.

The driver program 241 performs control on and status reading from the information processor hardware 3. The driver program 241 also makes access, as required, to the driver data 242. Such access includes, for example, access to be made in producing sound of a music instrument by the driver program 241.

The man-machine interface driver 25 receives from the man-machine interface 1 input information that is given by a human and converted into an electrical signal. The man-machine interface driver also performs output control where the man-machine interface 1 has an output function to a human.

Explanation will now be made on state control of the tasks to be administrated by the operating system 23. Task state control is herein exemplified with a high-speed processor operating system 63 that will be shown in FIG. 13 and the like, hereinafter described.

The high-speed processor operating system 63 is a multi-task operating system of an event driven method to control a plurality of task state based on occurrence of an event. The high-speed processor operating system 63 performs task scheduling based on an arrival-order algorithm to execute tasks in the order of satisfying an execution condition.

Figure 5:
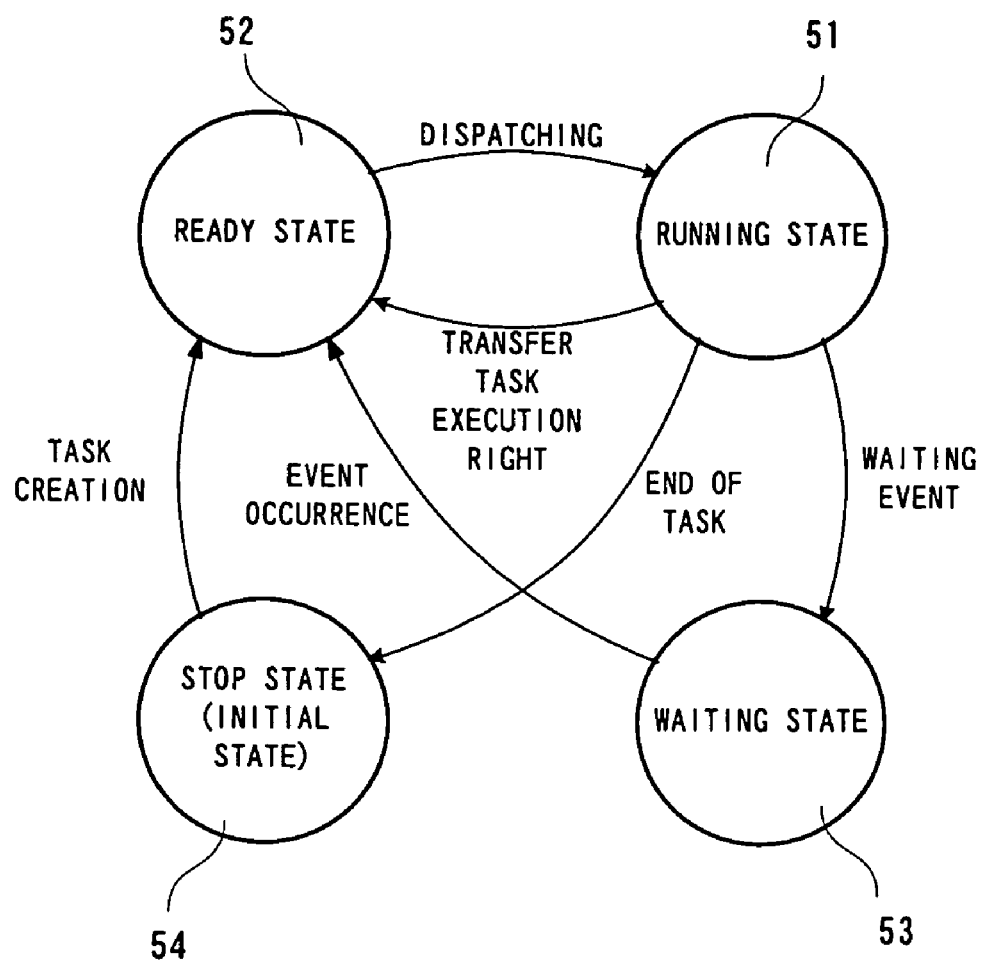
FIG. 5 is an illustrative view showing state transition of a task to be controlled by a high-speed processor operating system.

The task states to be controlled include, as shown in FIG. 5, four states, i.e. a running state 51, a ready state 52, a waiting state 53 and a stop state 54. Every task is in any one of these states. The running state 51 refers to a state that the task is given an available right to a central processor 93 shown in hereinafter-referred FIG. 12 wherein a processing is made by the central processor 93. For a high-speed processor 9 having only one central processor 93, the task in a running state 51 is always one or less in the number. The ready state 52 refers to a state that no available right to the central processor 93 is given because a condition for task execution is ready but another task is now in a running state 51. In this state, the task is in a queue to wait for getting an available right to the central processor 93. The waiting state 53 refers to a state that the task is waiting for a certain event wherein an available right to the central processor 93 is not needed until an event occurs. The stop state 54 refers to a state the task has not been created or a state the task processing has been completed.

Here, events include, for example, completion of data transfer due to direct memory access (DMA), occurrence of interruption, release of shared resources, etc.

Explanation will be made on transit of task state in FIG. 5. At first, every task is in a stop state 54 before creation (initial state). Task creation is made through a system call to create a task from another task or by the high-speed processor operating system 63 itself. A created task transits to a ready state 52. The task in the ready state 52 is positioned to a tail of a queue waiting for acquiring an available right to the central processor 93. When the task in a running state 51 transits to another state, the high speed processor operating system 63 causes the task at a head of the queue to transit into a running state 51. This is referred to as operating system dispatching. When the task in the running state 51 is required to wait for a certain event, the same task issues a system call to wait the event. The high-speed processor operating system 63 in turn causes the same task to transit to a waiting state 53. When an event waited by the task in the waiting state 53 occurs, the high-speed processor operating system 63 causes the same task to transit into a ready state 52. The task entered the ready state 52 is similarly positioned to a tail of the queue. If the task in the running state 51 completes a process, a task-end system call is issued to the high-speed processor operating system 63. Receiving this, the high-speed processor operating system 63 transits the task to a stop state 64. The task entered the stop state 54 remains in the stop state 54 until creation is again made.

In this manner, the high-speed processor operating system 63 switches a task in the running state 51 based on waiting and occurrence of an event. Accordingly, unless the task in a running state 51 transits from the running state 51 to another state through a system call, the same task will remain occupying an available right to the central processor 93. This however results in a possibility that the task for real time process, such as video information processing or sound reproducing processing, cannot acquire an available right to the central processor 93 for a long time of period. To avoid this, the high-speed processor operating system 63 possesses a system call for a task in a running state 51 to transfer its own available right over to another task.

If the task in a running state 51 issues a system call to transfer its available right, the high-speed processor operating system 63 transits the same task to a ready state 52 and positions it to a tail of the queue. Thereupon, if there is no another task in a ready state 52, the same task immediately transits into a running state 51 again to continue execution.

Figure 6:
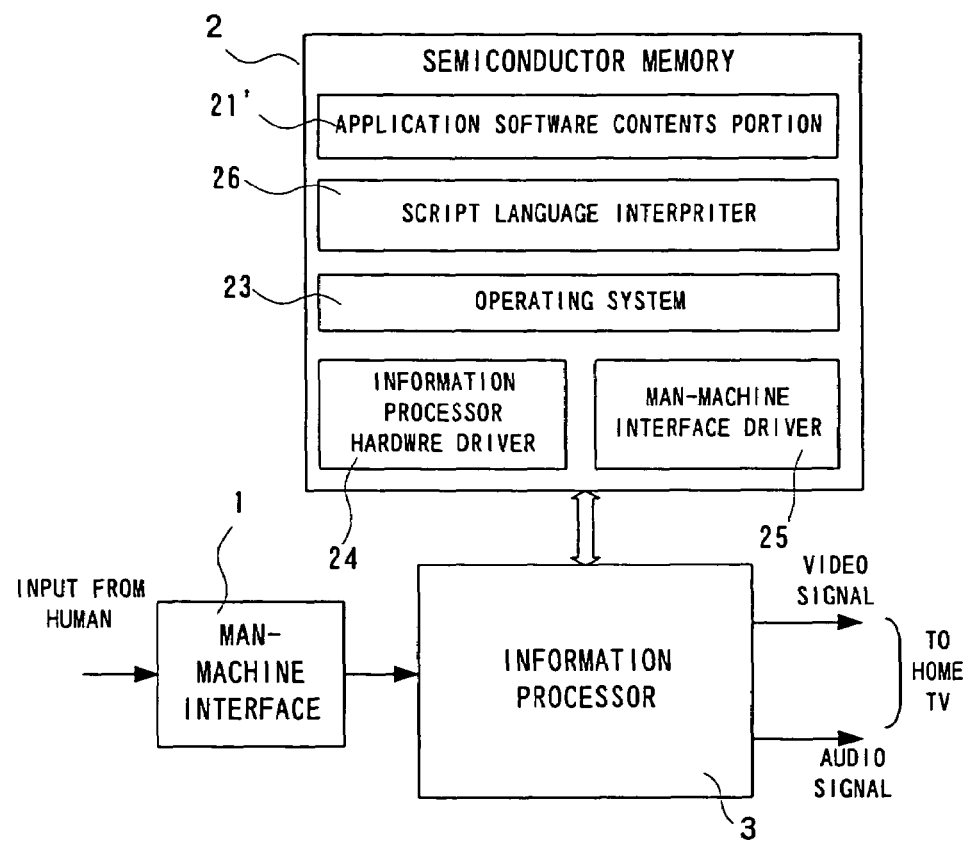
FIG. 6 is a block diagram showing one embodiment wherein script language is used.
Figure 7:
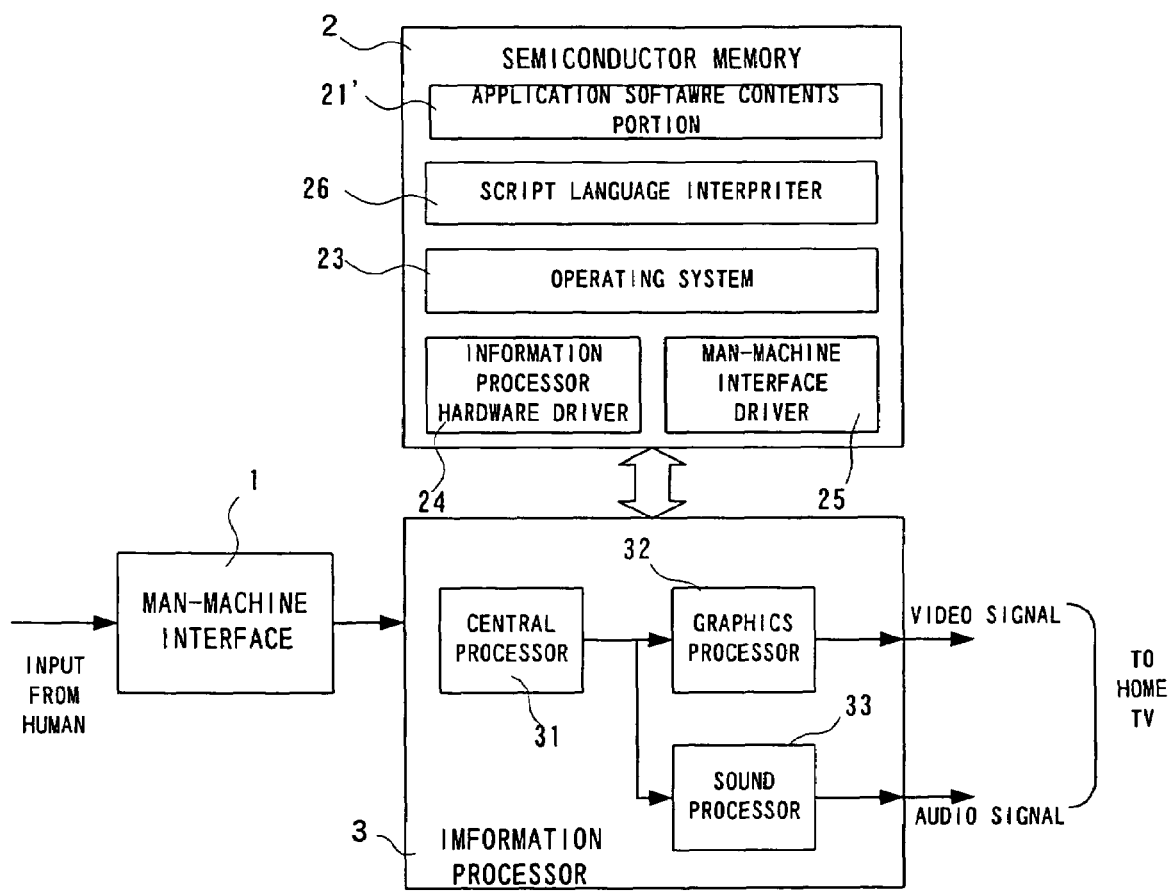
FIG. 7 is a block diagram showing another embodiment wherein script language is used.

In preparation of information processing apparatus application software, a script language may be used, an embodiment of which is illustrated in FIG. 6 and FIG. 7.

In such a case, the semiconductor memory 2 has software configured by a contents portion 21', a script language interpreter (hereinafter may be briefly described as "interpreter") 26, an operating system 23, a hardware driver 24 and an interface driver 25.

Figure 8:
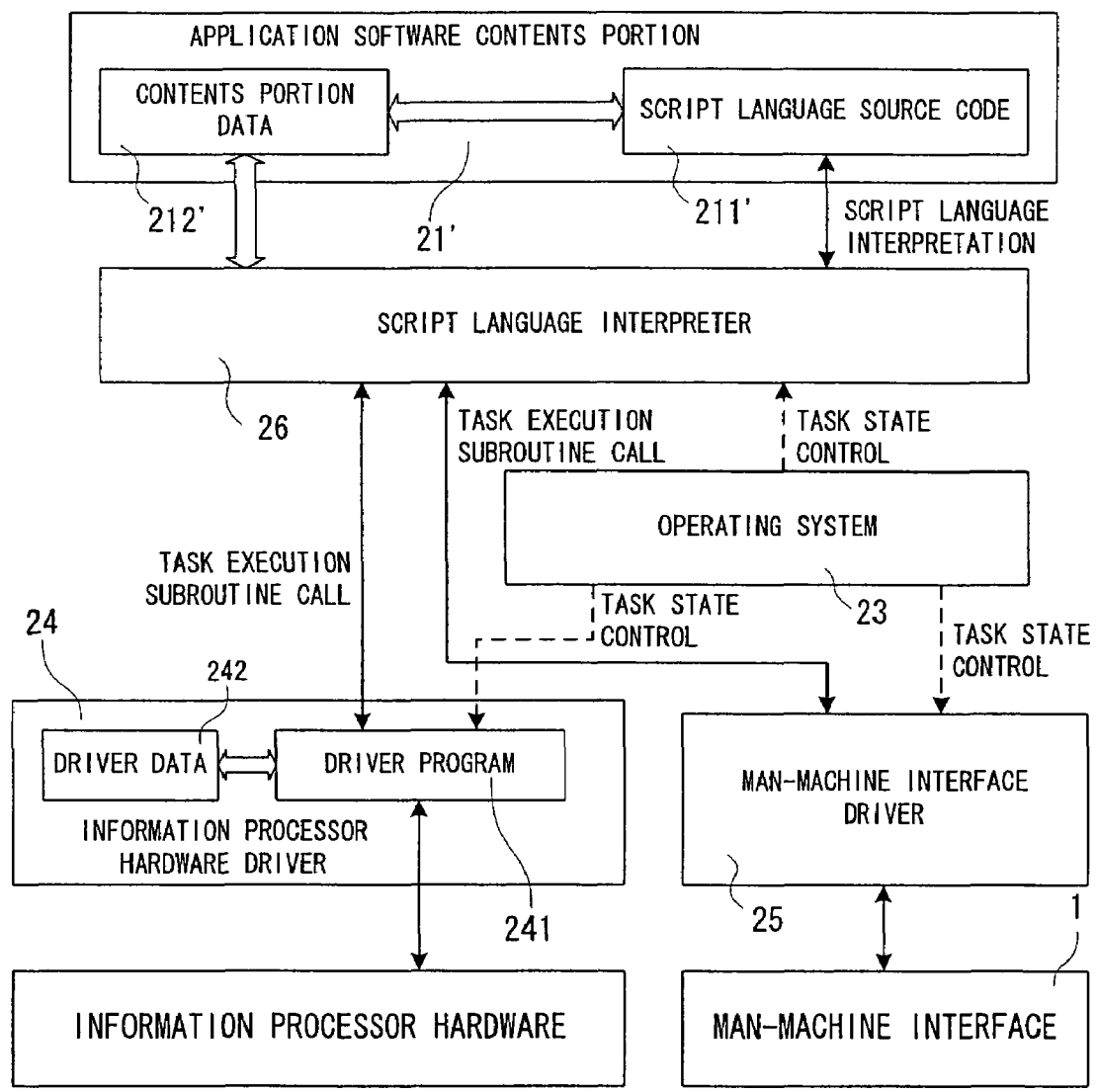
FIG. 8 is a function block diagram showing a module configuration wherein script language is used.

FIG. 8 shows a module configuration diagram of an embodiment using a script language. In FIG. 8, the contents portion 21' is configured by a script language source code portion 211' described in a script language, and contents data 212'. The script language source code portion 211' is a program for performing particular processing to achieve an objective of the information processing apparatus. Specifically, the script language source code portion 211' performs a processing including all the processing, among those required by the application software, not to be made by the operating system 23, hardware driver 24 and interface driver 25 among those required by the application software. On the other hand, the contents data 212' is a set of data to be dealt with by the script language source code portion 211' or script language interpreter 26. Specifically, the contents data includes, for example, image data, music score data, sound effect waveform data and various tables to be used by a program.

The script language interpreter 26 sequentially interprets the script language source code 211' to produce and execute an object codes for interpretation by the information processor 3. The script language to be used is not especially limited in kind but may be an existing script language, such as a hyper-text markup language (hereinafter abbreviated as "HTML"). Note that, because overhead is great in interpreter-schemed software execution, an exclusive script language is preferably used that is optimized for the hardware of the information processor 3.

In also this embodiment, the information processor 3 has a central processor 31, a graphics processor 32 and a sound processor 33. It is referred that these processors share a memory space so that the semiconductor memory 2 is allocated within the shared memory space.

Detailed embodiments of the invention will be explained hereunder. It should be noted that the invention be not limited only to these embodiments.

First Embodiment

A first embodiment is on a baseball game apparatus configured by the information processing apparatus according to the present invention.

In the baseball game apparatus, pitching or batting action actually performed by a user or player is converted into an electrical signal. Based on the electrical signal and software stored in the semiconductor memory 2, a high-speed processor 9 executes an operation process to output video and audio signals onto a home TV set.

Figure 9:
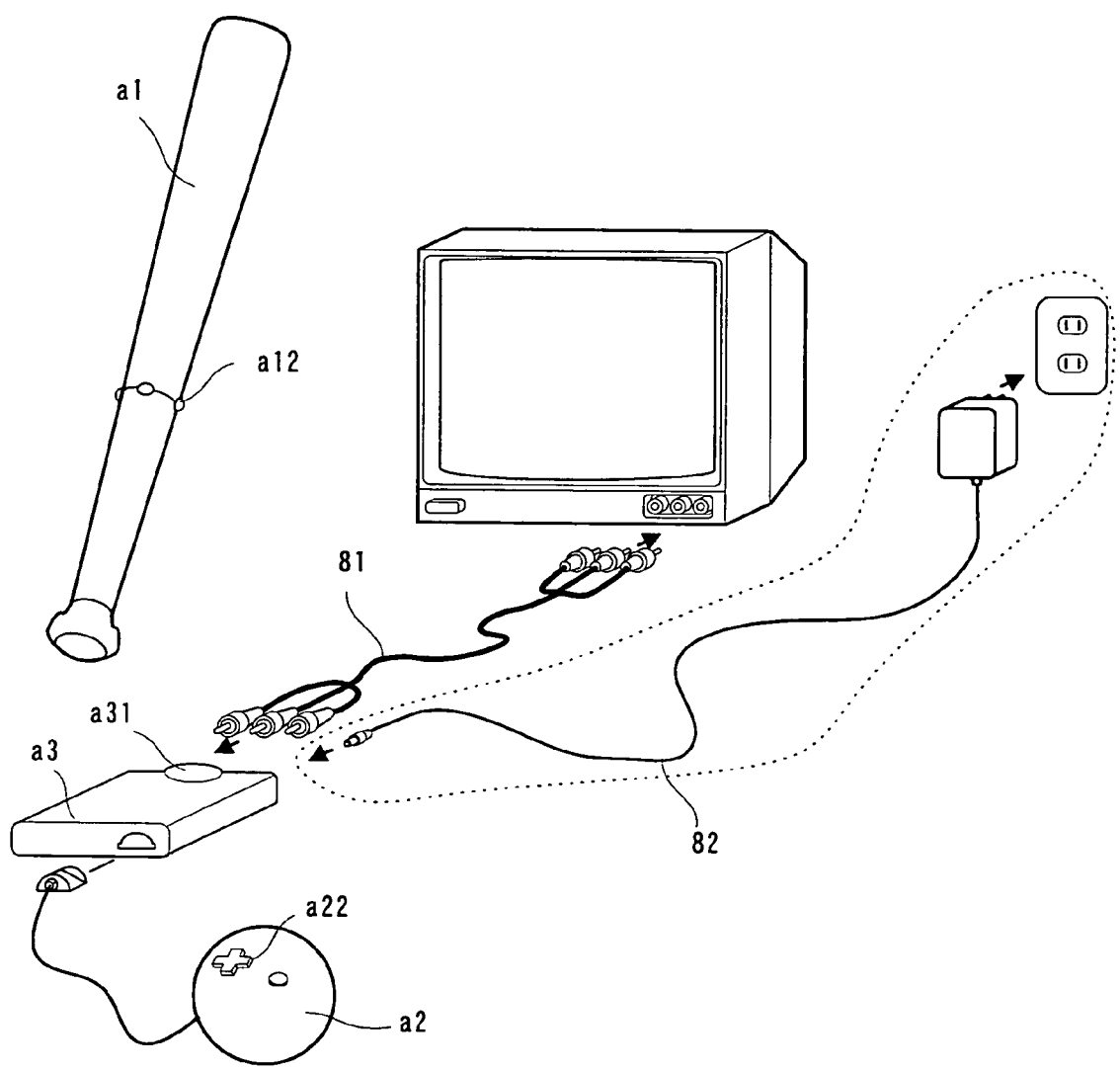
FIG. 9 is an illustrative view showing a system configuration of a baseball game apparatus according to a first embodiment.

Referring to FIG. 9, the baseball game apparatus in this embodiment is constituted by a bat-type input device a1, a ball-type input device a2 and a main body a3.

The player uses an AV cable 81 to connect between the main body a3 and the home TV set. The bat-type input device a1 is supplied with power from a dry cell (not shown) accommodated in the bat-type input device a1. The ball-type input device a2 and main body a3 have power supplied from a dry cell (not shown) accommodated in the main body a3 or through an AC adapter 82 connected to the main body a3.

The player can make an input by actually performing a batting action using the bat-type input device a1, a pitching action actually made using the ball-type input device a2, or manipulating a key switch a22 provided on the ball-type input device a2. The bat-type input device a1 has an infrared-ray LED a12 to enable communication to and from the main body a3. On the other hand, the ball-type input device a2 is connected to the main body a3 through a cable. The baseball game apparatus can be played by one or two players. When playing by one player, any one of the input devices is used to play a game. When playing by two players, the input devices are respectively used by the players to play a game.

Figure 10:
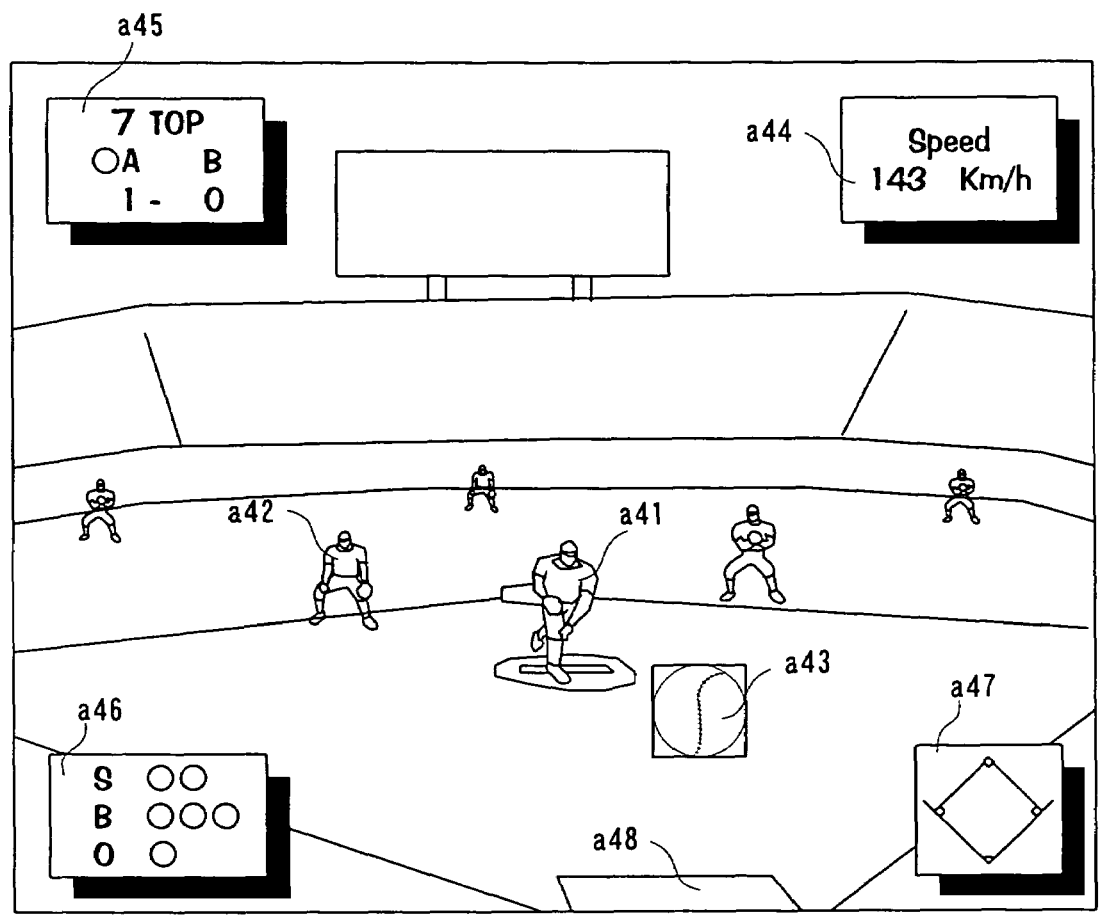
FIG. 10 is an illustrative view showing a game scene as a display example on the baseball game apparatus.

In the baseball game apparatus of this embodiment, a game scene as shown in FIG. 10 will be displayed. In this display example, the display scene includes a baseball field as viewed from a view point of a batter, pitcher a41, fielder a42 or the like. Also, there are displayed, on the scene, a ball speed a44, a game score a45, various counts a46 including out, strike and ball, a presence or absence of a runner on each base a47, etc.

In the baseball game apparatus, an acceleration is detected that is caused by a pitch action actually made by one player. According to a magnitude of the acceleration, a pitcher a41 on the scene can make a pitch by changing a ball speed or course. When the pitcher a41 makes a pitch, a ball a43 displayed on the scene moves while changing in size, thus providing an image moving from a pitcher a41 to home base a48 position. In this case, the player on the pitcher side is allowed to select a version of ball pitching through using the key switch a22 on the ball-type input device a2. Meanwhile, the bat-type input device a1 swung by the player on the batter side causes a batter to hit back the ball a43 in timing with the swing action.

Figure 11:
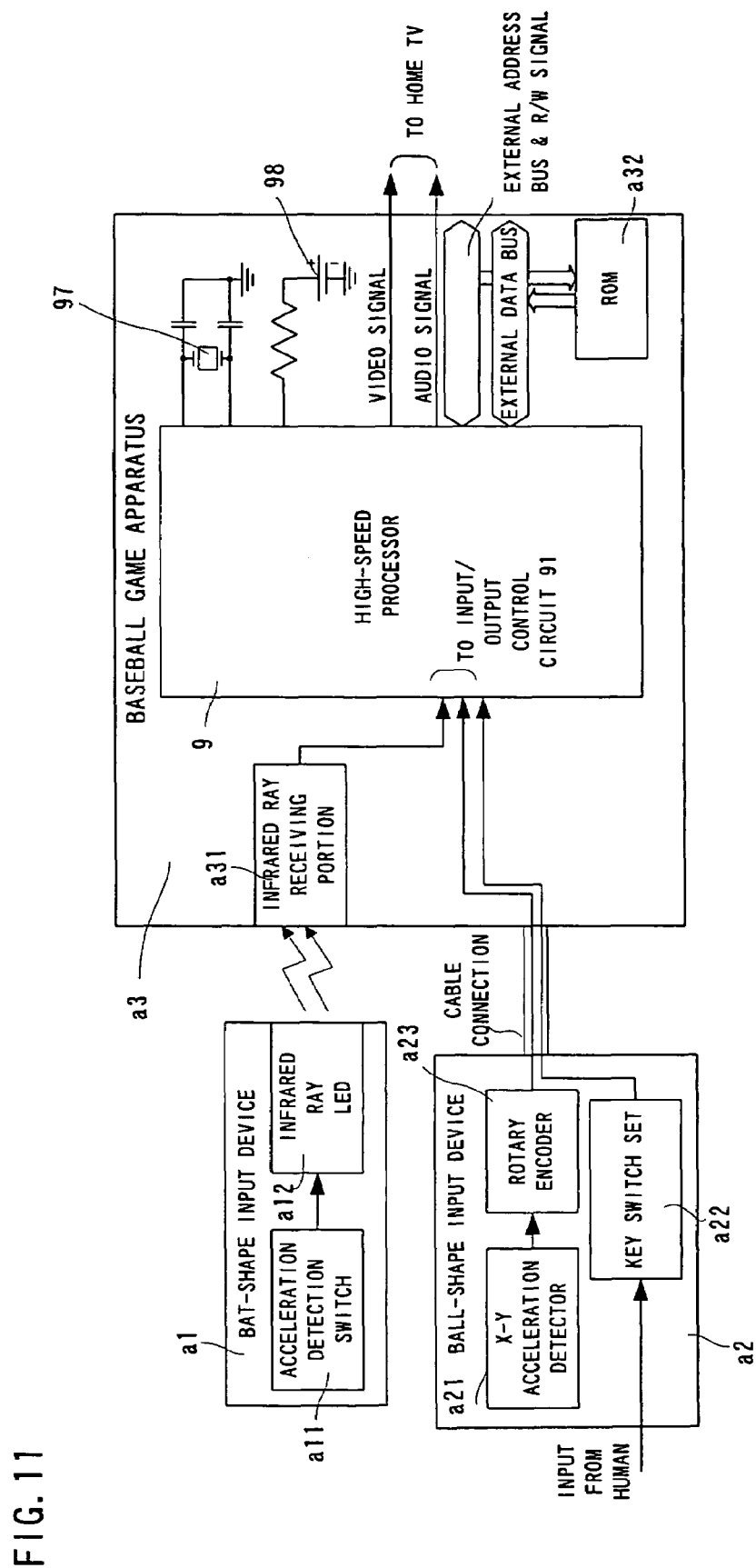
FIG. 11 is a block diagram showing an electrical configuration of the baseball game apparatus.

Referring to FIG. 11, the bat-type input device a1 is constituted by an acceleration detection switch a11 and infrared-ray LED a12. The ball-type input device a2 is made by an X-Y acceleration detector a21, a rotary encoder a23 and a key switch set a22. The main body a3 is configured by a high-speed processor 9, a ROM a32 and an infrared-ray receiving portion a31. The high-speed processor 9 requires an oscillation circuit formed by a quartz oscillator 97 or the like. Also, in this embodiment a battery 98 is provided to back up the data of an SRAM forming part of an internal memory for the high-speed processor 9.

The ball-type input device a1 and bat-type input device a1s are correspond to the man-machine interface 1, the ROM a32 to the semiconductor memory 2, and the high-speed processor 9 to the information processor 3.

The bat-type input device a2 is to detect an acceleration caused upon moving the input device itself in space due to player's swing action, and to convert a detected acceleration into an electrical signal. The swing action of the player causes the acceleration detection switch a11 to operate so that a detected acceleration can be converted into a signal representative of binary ON/OFF. This signal is delivered to an input/output control circuit 91 of the high-speed processor 9 via infrared-ray communication between the infrared-ray LED a12 and the infrared-ray receiving portion a31 on the main body a3. The input/output control circuit 91 delivers the signal to the central processor 93 under control of the central processor 9.

The ball-type input device a2 is to convert into electrical signals an acceleration undergone by this input device itself due to player's pitch action and key manipulation. The acceleration caused by the player's pitch action is decomposed into and detected as signals representative of an orthogonal X-Y bi-axial acceleration by the X-Y acceleration detector a21. The detected signal is converted into digital data representative of magnitudes and directions of X-axis and Y-axis accelerations by the rotary encoder a23, and delivered to the input/output control circuit 91 of the high-speed processor 9. Also, the key input of the player is converted into a signal preventative of a binary ON/OFF by the key switch set a22, and delivered to the input/output control circuit 91 of the high-speed processor 9. The input/output control circuit 91 under control of a central processor 93 delivers the digital data representing an acceleration magnitude and direction as well as the signal from the key switch set a22 to the central processor 93.

The ROM a32 stores software modules for driving the high-speed processor 9.

The high-speed processor 9 is similar to that as disclosed in Japanese Patent Laid-open No. H10-307790 described before. The use of this high-speed processor provides realization of a high-performance system with a small circuit scale.

Figure 12:
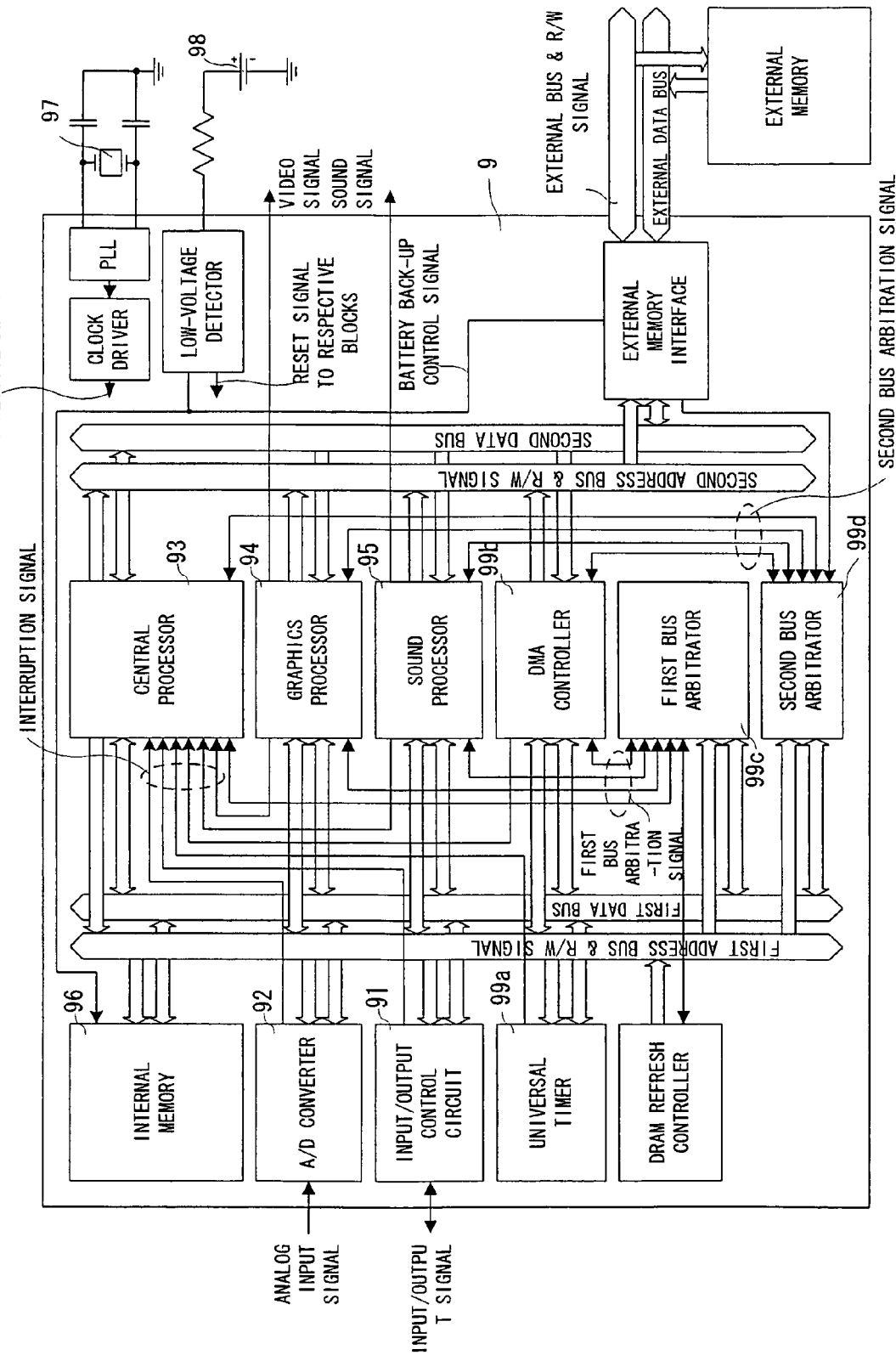
FIG. 12 is a block diagram showing an electrical configuration of a high-speed processor.

Referring to FIG. 12, the high-speed processor 9 has a graphics processor 94 configured by a scanning image producing circuit means as disclosed in Japanese Patent Laid-open No. H10-222151 stated before, and a color video encoder as disclosed in Japanese Patent Laid-open No. H10-301552 stated before.

Figure 13:
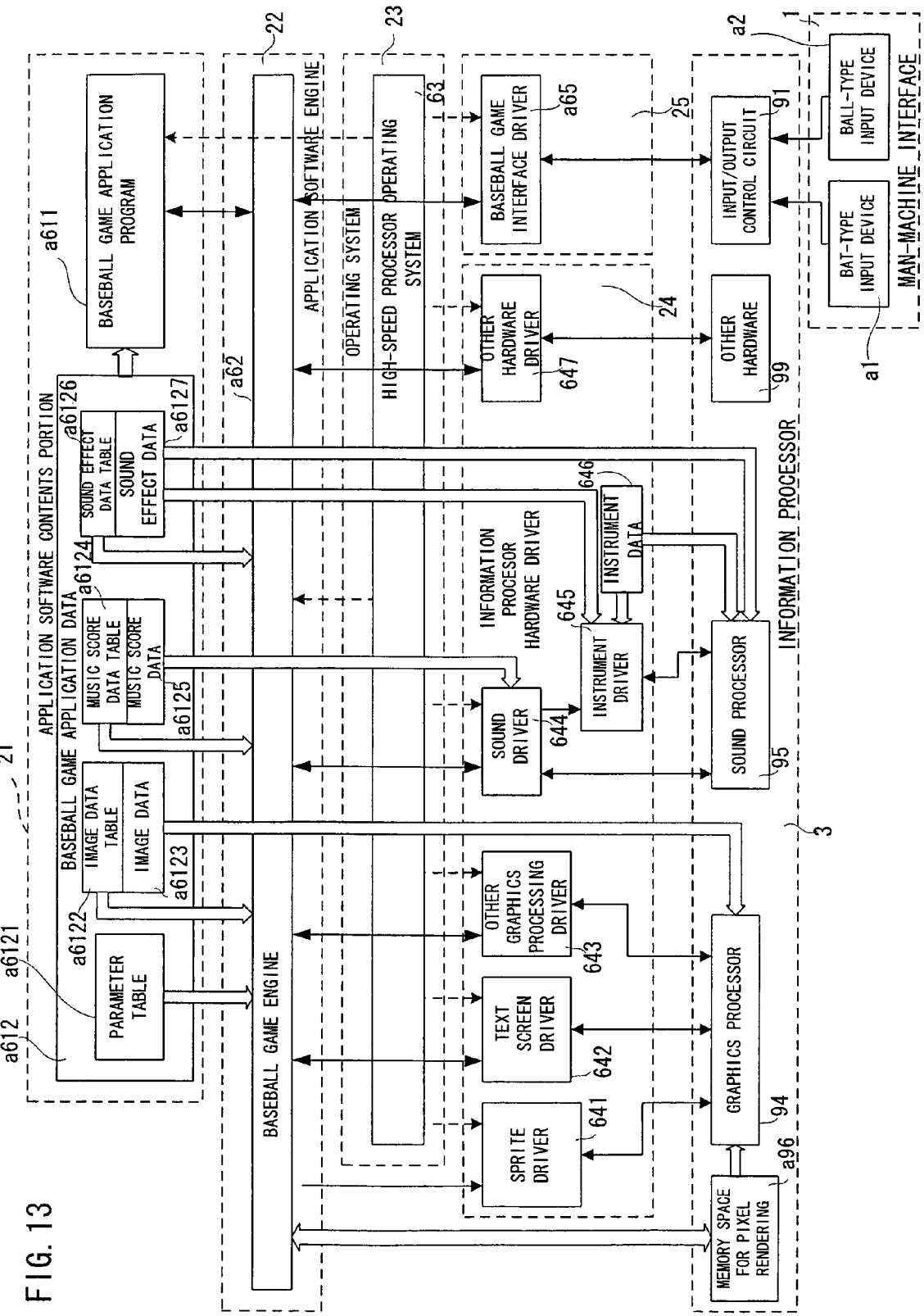
FIG. 13 is a function block diagram showing a schematic module configuration of the baseball game apparatus.

FIG. 13 is an illustrative view showing a schematic module configuration of a baseball game apparatus of this embodiment. In FIG. 12, all the module configurations are shown including software and hardware as viewed from the software to be run on the central processor 93 of the high-speed processor 9.

A baseball game apparatus program a611 and baseball application data a612 correspond to the contents portion 21. That is, the baseball game application program a611 corresponds to the contents program 211 while the baseball application data a612 to the contents data 212. The baseball application data a612 is configured by a parameter table a6121, an image data table a6122, image data a6123, a music score data table a6124, a music score data a6125, an effect-sound data table a6126 and effect-sound data a6127.

The baseball game engine a62 corresponds to the engine 22. The high-speed processor operating system 63 corresponds to the operating system 23.

To the hardware driver 24 correspond a sprite driver 641, a text screen driver 642, an other-graphics processing driver 643, a sound driver 644, an instrument driver 645, instrument data 646 and an other-hardware driver 647. Among them the instrument data 646 corresponds to the driver data 242 and the other modules than that to the driver program 241.

The baseball game interface driver a65 corresponds to the interface driver 25.

A graphics processor 94, sound processor 95, input/output control circuit 91 and other hardware 99 are hardware modules included in the high-speed processor 9. Also, a memory space for pixel rendering a96 is part of a space of an internal memory 96 of the high-speed processor 9.

All the modules corresponding to the contents portion 21, engine 22, operating system 23, hardware driver 24 and interface driver 25 are previously stored within the ROM a32. However, the program codes included in these modules are partly developed on the internal memory of the high-speed processor 9, in order to run software at high speed.

The baseball game application program a611 administers overall operation control, title display, game mode selection, common processing between the game modes and unique processing to each game mode. The baseball game apparatus provides four modes, i.e. a game-play mode, a free batting mode, a free pitching mode and a homerun contest mode. Here, the common processing between the game modes includes, for example, operation on a ball locus. Also, the particular processing for each game mode includes, for example, processing to control an fielder in the game-play mode, image processing with respect to a view point of a pitcher in the free pitching mode, and so on.

The parameter table a6121 is a set of values to be substituted to parameters during operation, e.g. ability data on the players. The parameter table a6121 is accessible from the baseball game application program a611 and/or baseball game engine a62.

The image data table a6122 is a table to represent a site storing the image data a6123. The image data table a6122 is accessible from the baseball game application program a611 and/or baseball game engine a62, and used to notify a site storing the image data a6123 to the graphics processor 94.

The image data a6123 is a set of image data to be used on the baseball game apparatus. The image data includes still image data, such as of a baseball ground and score display a45, and motion image data, such as of a ball a43, pitcher a41 and fielder a42. The image data a6123 includes a part to be directly accessed from the graphics processor 94 and a part to be used for original images upon enlarging/reducing/rotating an image by the baseball game engine a62.

The music score data table a6124 is a table to represent a site storing the music score data a6125. The music score data table a6124 is accessible from the baseball game application program a611 and/or baseball game engine a62, and used to notify a site of storing the music score data a6125 to the sound driver 644.

The music score data a6125 is a set of music score data of melodies to be used on the baseball game apparatus. The music score data a6125 is accessible from the sound driver 644.

The sound effect data table a6126 is a table to represent a site storing the sound effect data a6127. The effect-sound data table a6126 is accessible from the baseball application program a611 and/or baseball game engine a62, and used to notify a site storing the sound effect data a6127 to the instrument driver 645 and sound processor 95.

The effect-sound data a6127 is a set of waveform and envelop data, such as sound effects, to be used in a game. The sound effect includes, for example, batting sound upon batting of a ball against a bat, umpire's voice and the like. The waveform data in the sound effect data a6127 is accessible from the sound processor 95 while the envelop data and the like are accessible by the instrument driver 645 and/or sound processor 95.

The baseball game engine a62 administers a particular process for the baseball game requiring three-dimensionally image processing as in this embodiment, among the regular processes required in the baseball game apparatus. The processing include, concretely, ball locus operation, pitcher or batter motion control, animation control, basic rule control, sound control, input control and so on. The baseball game engine a62 is to be utilized in function according to a subroutine call or task creation from the baseball game application program a611.

The high-speed processor operation system 63 administers state control of all the tasks, task scheduling, shared resource control between tasks, interrupt control, system start-up and initial setting, and so on. The high-speed processor operating system 63 administers state control of all the tasks included in the baseball game application program a611, baseball game engine a62, sprite driver 641, text screen driver 642, other-graphics processing driver 643, sound driver 644, instrument driver 645, other-hardware driver 647 and baseball game interface driver a65. The scheme of task state control is similar to that as was explained in FIG. 5. Also, the task scheduling uses an arrival-order algorithm. The shared resource control between tasks uses a technique utilizing semaphore.

The sprite driver 641 administers such processing as sprite coordinate control, sprite no. assignment control, sprite display priority control, sprite color control, variable size sprite display (combination of a plurality of sprites), sprite data transfer control. Here, the sprite means image elements formed by two-dimensional pixel arrangement that is freely rearrangeable on the screen. The sprite is suited to display motion images or the like. The sprite driver 641 controls the graphics processor 94 through a control register provided in the graphics processor 94 and a sprite memory as a local memory included in the graphics processor 94. Also, the sprite driver is to be utilized in function according to a subroutine call or task creation from the baseball game engine a62.

The text screen driver 642 administers text-screen coordinate offset control, character priority control, character rewriting, character color control, and so on. Here, the character refers to an image element formed by two-dimensional pixel arrangement. The text screen is an image element formed by two-dimensional character arrangement, and suited to display a still image. The text screen driver 642 controls the graphics processor 94 through a control register provided in the graphics processor 94 and text array data put in the internal memory 96 of the high-speed processor 9. Also, the text screen is utilized in function according to a subroutine call or task creation from the baseball engine a62.

The other-graphics processing driver 643 administers window mask control, HV counter IRQ control, and so on. Here, the window mask represents a region to provide an image effect upon a composite image of a sprite and a text screen. Also, the HV counter is hardware counter included in a graphics processor 94, and is representative of horizontal and vertical positions of pixels now being processed. The HV counter IRQ is IRQ to be generated to the central processor 93 when the position represented by the HV counter coincides with an arbitrarily predetermined position. The other-graphics processing driver 643 controls the graphics processor 94 through a control register provided in the graphics processor 94. Also, the other-graphics processing driver is utilized in function according to a subroutine call or task creation from the baseball game engine a62.

The sound driver 644 administers interpretation of the music score data a6125 stored in the application software contents portion 21, assignment of a sound channel to the instrument driver 645, and control of the volume for each sound channel. The sound driver 644 controls the sound processor 95 through a control register provided in the sound processor 95 and parameter table put in the internal memory 96 of the high-speed processor 9. Also, the sound driver is utilized in function according to a subroutine call or task creation from the baseball game engine a62.

The instrument driver 645 is to control reproducing of a music instrument and sound effect. One instrument driver is required for reproducing one music instrument. The instrument driver 645 makes access to the music instrument waveform and envelop data included in the instrument data 646 and to the sound effect waveform and envelop data included in the sound effect data a6127. The instrument driver controls the sound processor 95 through a control register provided in the sound processor 95 and parameter table put in the internal memory 96 of the high-speed processor 9. Also, the instrument driver is utilized in function according to a subroutine call from the sound driver 644.

The other-hardware driver 647 administers control of a DMA controller 99$b$, timer circuit 99$a$, first bus arbitrator 99$c$ and second bus arbitrator 99$d$. The other-hardware driver 647 controls these of hardware through control registers respectively provided in the first bus arbitrator 99$c$ and the second bus arbitrator 99$d$. Also, the other-hardware driver is utilized in function according to a subroutine call or task creation from the baseball game engine a62.

The baseball game interface driver a65 receives an input from the ball-type input device a2 and bat-type input device a3 as the man-machine interface 1 through the input/output control circuit 91 in the high-speed processor 9, and delivers it to the baseball game engine a62. Here, the baseball game interface driver a65 abstracts the hardware of the bat-type input device a1 and ball-type input device a2, and provides to the baseball game engine a62 a program interface to handle these input devices with greater simplicity. The baseball game interface driver a65 is utilized in function according to a subroutine call or task creation from the baseball game engine a62.

The memory space for pixel rendering a96 is a space to store an enlarged/reduced/rotated image, and uses part of the internal memory 96 of the high-speed processor 9. The memory space for pixel rendering a96 is written by a pixel rendering engine a6214 included in the baseball game engine a62, the data of which is read out as sprite image data by the graphics processor 94.

Figure 14:
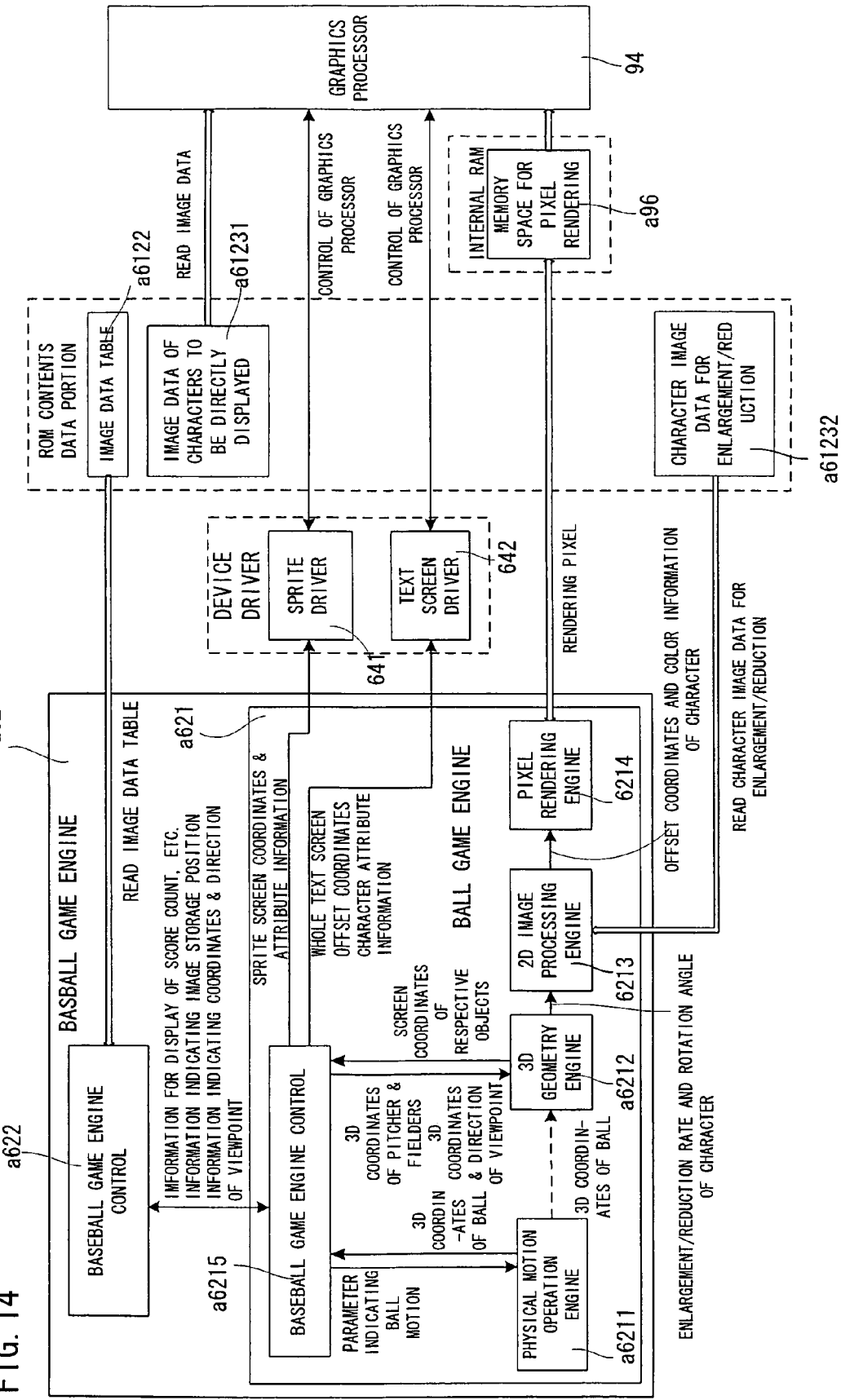
FIG. 14 is an illustrative view showing a configuration of various sections when putting the eye on graphics processing in a baseball game engine.

FIG. 14 is a schematic diagram showing a configuration of various sections when putting the eye on a graphics processing of the baseball game engine a62. Descriptions are herein made by separately on an image data process to display using a text screen, such as a baseball field or score display portion a45, and an image data process to display with using sprite, such as a ball a43, pitcher a41 and fielder a42. Description is made also on the functions of various sections to be made in the processes.

First, described is an image data process to display using a text screen and the functions of the related sections. As stated before, the baseball game engine a62 includes a ball game engine a621. The ball game engine 621 further includes a physical motion operation engine a6211, a 3D geometry engine a6212, a 2D image processing engine a6213 and a pixel rendering engine a6214. Also, the baseball game engine a62 is provided with a baseball game engine control a622 while the ball game engine a621 has a ball game engine control a6215.

In order to display an image of a baseball field or score display a45, the baseball game engine control a622 reads out information representative of a site storing such an image out of the image data table a6122. The baseball game engine control a622 also delivers information about screen display with a score, count or the like, information representative of a site storing the image and information representative of a coordinate and direction of a view point.

The ball game engine control a6215 calculates an offset coordinate of an retire text screen, attribute information of a character to form a text screen, etc. based on the information received from the baseball game engine control a622, and delivers them to the text screen driver 642.

The text screen driver 642 administers such processing as coordinate offset control of a text screen, character priority control, character rewriting, character color control and so on based on the information received from the baseball game engine control a622.

The graphics processor 94 reads out character image data for constituting a text screen out of direct-display character image data a61231 according to the control from the text screen driver 642, and creates a text screen image.

Description will now be made on the image data processing to display using sprite and the functions of the related sections. In order to handle a ball or fielder image as basic image data for enlargement/reducing/rotation, the baseball game engine control a622 reads out information representative of a site storing such an image out of the image data table a6122. Meanwhile, because the images to be displayed using sprite includes image data directly read-out and displayed by the graphics processor 94 without performing enlargement/reduction/rotation, reading out is also made for the information representative of a position storing such an image. The baseball game engine control a622 also calculates ball movement information, information of a position and state of a pitcher, fielder, batter and runner, and information of a coordinate and direction of a view point, and delivers them to the ball game engine control a6215.

The ball game engine control a6215 calculates a parameter value representative of a ball movement state based on the information received from the baseball game engine control a622, and delivers it to the physical motion operation engine a6211. The ball game engine control a6215 also calculates a three-dimensional coordinate of an object such as a pitcher and fielder, and delivers together with the information of a viewpoint three-dimensional coordinate and directional vector to the 3D geometry engine a6212.

The physical motion operation engine a6211 in this embodiment performs an operation on a parabolic movement due to ball pitching and an operation of collision movement upon collision of a ball against a bat. The physical motion operation engine a6211 first receives a parameter representative of a ball movement state from the ball game engine control a6215. This parameter, for example, may be an initial velocity and direction vector of a ball upon pitching, a mass and velocity vector of an object with which the ball collide. The physical motion operation engine a6211 calculates a change in movement of a ball based on the received parameter and current state of the ball, and delivers a ball three-dimensional coordinate for rendering next screen to the 3D geometry engine a6212 through the ball game engine control a6215 or directly.

The 3D geometry engine a6212 in this embodiment performs processing of operation on relative movement of an object in the three-dimensional space due to change in view point of a batter or pitcher, and operation on perspective projection of them from a three-dimensional space onto a two-dimensional screen coordinate. The 3D geometry engine a6212 first receives a ball three-dimensional coordinate from the physical motion operation engine a6211 or ball game engine control a6215, and a pitcher or outfielder three-dimensional coordinate and viewpoint three-dimensional coordinate and direction vector from the ball game engine control a6215. Based on the received information about them, the 3D geometry engine determines an object screen coordinate and an enlargement/reduction ratio and rotation angle of a character representative of the object, and delivers the object screen coordinate to the ball game engine control a6215 and the character enlargement/reduction ratio and rotation angle to the 2D image processing engine a6213.

The 2D image processing engine a6213 in this embodiment performs an image processing of enlargement/reduction/rotation on the character representative of the ball or the like. The 2D image processing engine a6213 receives a character enlargement/reduction ratio and rotation angle from 3D geometry engine a6216 and reads character basic image data out of character image data for enlargement/reduction (a61232) as part of the image data a6123 to thereby determine enlarged/reduced/rotated image data through operation. The operation result is delivered in the form of an in-character offset coordinate and color information on a pixel-by-pixel basis to a pixel rendering engine a6214.

The pixel rendering engine a6214 in this embodiment performs rendering process of a character representative of a ball or the like to a memory space for pixel rendering a96. The pixel rendering engine a6214 receives an in-character offset coordinate and color information on a pixel-by-pixel basis from the 2D image processing engine a6213, and calculates an address and bit position of each pixel on a memory space to write designated color information. If the number of bits per pixel of the color information is not coincident with the number of bits per word on the memory, the pixel rendering engine a6214 makes access of read/modify/write to the memory space for pixel rendering a96 in order to rewrite the color information on a pixel-by-pixel basis.

The ball game engine control a6215 calculates a sprite screen coordinate and attribute information based on the screen coordinate of each object received from the 3D geometry engine a6212, and delivers it to the sprite driver 641.

The sprite driver 641 administers such processing as sprite coordinate control, sprite no. assignment control, sprite display priority control, sprite color control and sprite data transfer control in order to display each object, such as a ball, pitcher and fielder. Meanwhile, where the size of character representative of an object is greater than a size of sprite, a plurality of sprites are combined and used to display one object. The sprite driver 641 also administers processing to display a variable-sized sprite due to such combination of a plurality of sprites.

The graphic processor 94 reads sprite image data out of the memory space for pixel rendering a96 and image data of characters to be directly displayed (a61231) according to control from the sprite driver 641, thereby creating a sprite image.

The graphic processor 94 combines all the text screens with a sprite image to produce and output a video signal.

Explanation will be made as to how each module of software and hardware functions by exemplifying reproducing of a background music (hereinafter abbreviated as BGM), using a flowchart showing a processing in each module. FIG. 15, FIG. 16, FIG. 17 and FIG. 18 are flowcharts showing a procedure of from sound driver start-up to BGM reproducing.

The steps of processing and determination shown in the flowchart are carried out by the module described in an uppermost part thereof. For example, the processing of "start sound driver" (Se2) is shown to be executed by the baseball game engine a62. Similarly, the processing of "sound driver initial setting" (Sd1) is to be executed by the sound driver 644. Incidentally, among the processing in FIG. 15, FIG. 16, FIG. 17 and FIG. 18, there are included other steps than the steps representative of task states (St1, St2, etc.). They do not represent processing to be performed by the central processor 93. The execution by the central processor 93 is made in the order according to the solid arrows. Meanwhile, in the figures the baseball application program 611 is described briefly as an application program.

Figure 15:
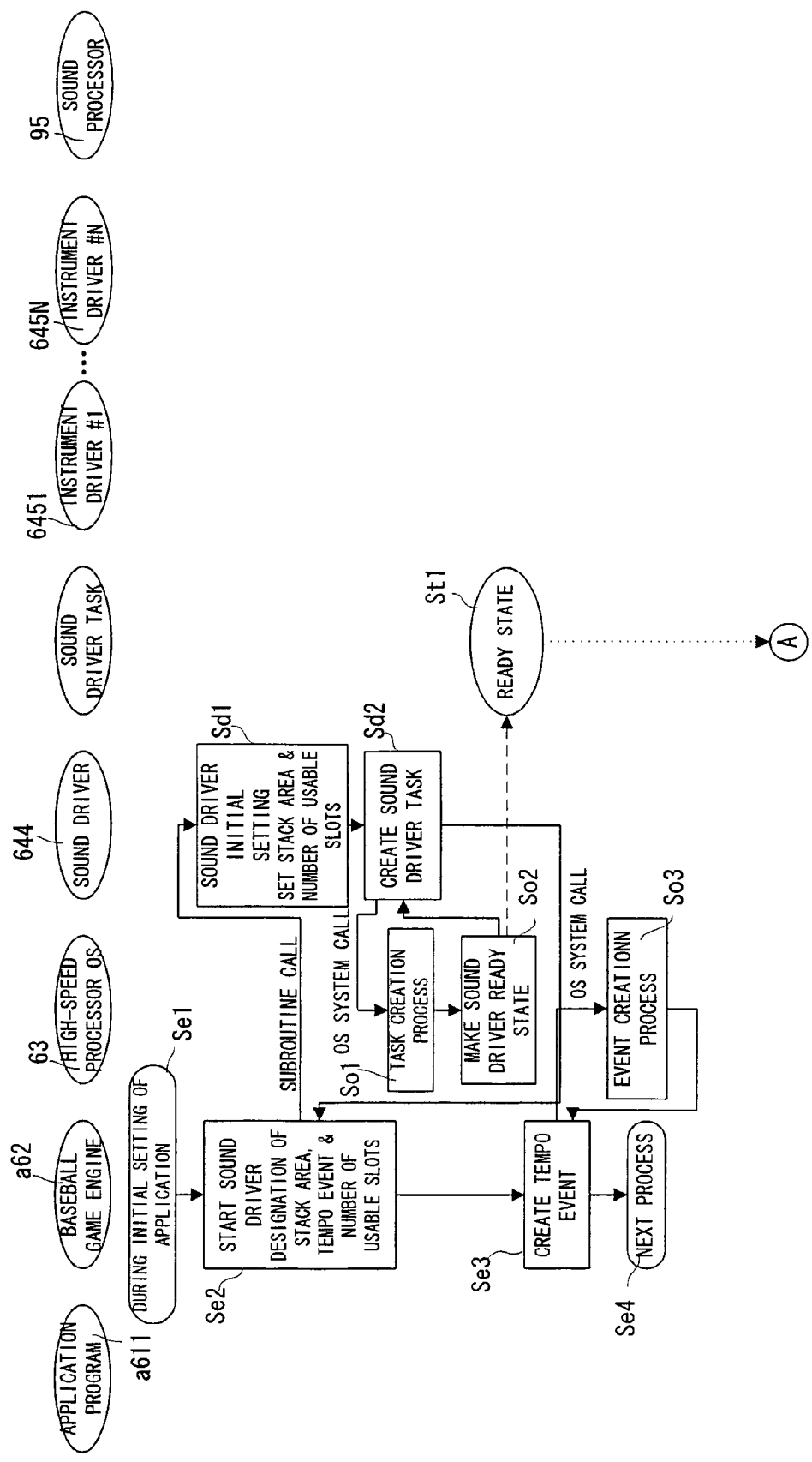
FIG. 15 is a flowchart showing a first procedure of from sound driver start-up to BGM reproducing.

In the case of FIG. 15, if the baseball game apparatus is started up, the high-speed processor operating system 63 first starts execution and performs basic initial settings for the hardware and software. The initial settings herein are commonly required for all of the software to be executed by the high-speed processor 9, and not relied upon the kind of an application. Thereafter, the high-speed processor operating system 63 creates a task previously designated for first execution. This task is included in the baseball game engine a62.

The baseball game engine 62 is required to perform initial settings needed for the application. The initial settings include "start sound driver" (Se2). When starting up the sound driver 644, the baseball game engine a62 performs designation of a stack area to be used by the sound driver 644, designation of a tempo event, and setting the number of slots to be assigned to the sound driver 644. Here, the tempo event means an event to fix a time unit of the processing by the sound driver 644, which is preferably an event occurring at a constant time interval, such as non-mask interruption to the central processor 93 (hereinafter may be abbreviated as NMI) or interrupt requirement from a timer circuit 99a (hereinafter may be abbreviated as timer IRQ). In the high-speed processor 9, NMI is issued by the graphics processor 94 at the beginning of a vertical blanking period of a video signal. Also, the slot herein refers to a sound channel over which reproducing is controlled by the sound processor 95. The sound processor 95 is capable of reproducing over sound channels of 16 in the number.

The sound driver 644 is started by calling a subroutine, included in the sound driver 644, to make initial setting to the sound driver 644. This initial setting including stack area setting, setting the number of assigned slots, initializing all the assigned slots, etc. (Sd1). After ending the initialization, the sound driver 644 creates task to administer a sound reproducing process based on the tempo event (Sd2). This task is herein called a sound driver task.

In the meanwhile, where one task creates another task, task creation is made by issuing a system call to the high-speed processor operating system 63. A subroutine of the sound driver 644 called by the task of baseball game engine a62 issues a system call to create a sound driver task to the high-speed processor operating system 63. The high-speed processor operating system 63 receives this system call and performs a process to create a sound driver task (So1), thereby causing the sound driver task to transit from a stop state to a ready state (St1)(So2). This means that the high-speed processor operating system 63 puts the sound driver task to a tail of a queue.

If the high-speed processor operating system 63 completes the task creation process, the execution of central processor 93 is returned to the sound driver 644.

Thereafter, the sound driver 644 ends the subroutine. The execution of the central processor 93 is returned to a baseball game engine a62, continuing execution from a process immediately after the subroutine call.

The baseball game engine a62 issues a system call to create a tempo event (Se3). Receiving this, the high-speed processor operating system 63 performs a process to create a tempo event (So3).

This ends the start-up of the sound driver 644. The process on the baseball game engine a62 moves another initial setting required by the application (Se4).

Figure 16:
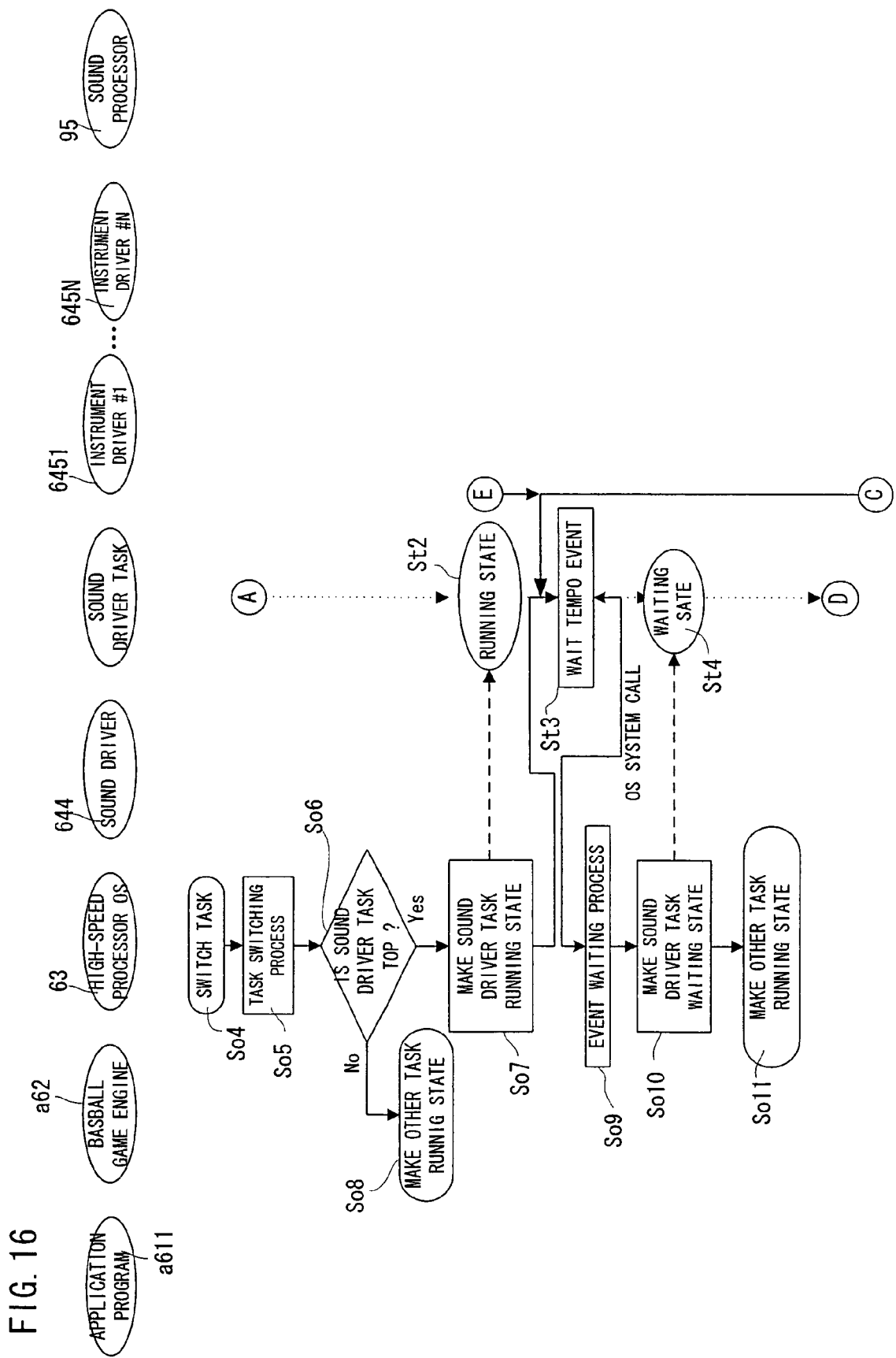
FIG. 16 is a flowchart showing a second procedure of from sound driver start-up to BGM reproducing.

In the case of FIG. 16, if a task in a running state issues a system call for transition to another state, the high-speed processor operating system 63 performs a process of switching the task (So5) to transit a task existing at a head of the queue among the tasks in a ready state into a running state. If herein a sound driver task is at the head of the queue, the high-speed processor operating system 63 transits the sound driver task into a running state (St2) and another task, if present it the head of the queue, into a running state (So8).

Because the sound driver task makes a processing based on a tempo event, the sound driver task turned into a running state issues system call to wait for a tempo event (St3). Receiving this, the high-speed processor operating system 63 transits the sound driver task to a waiting state (So10) and other tasks to a running state (So11).

Figure 17:
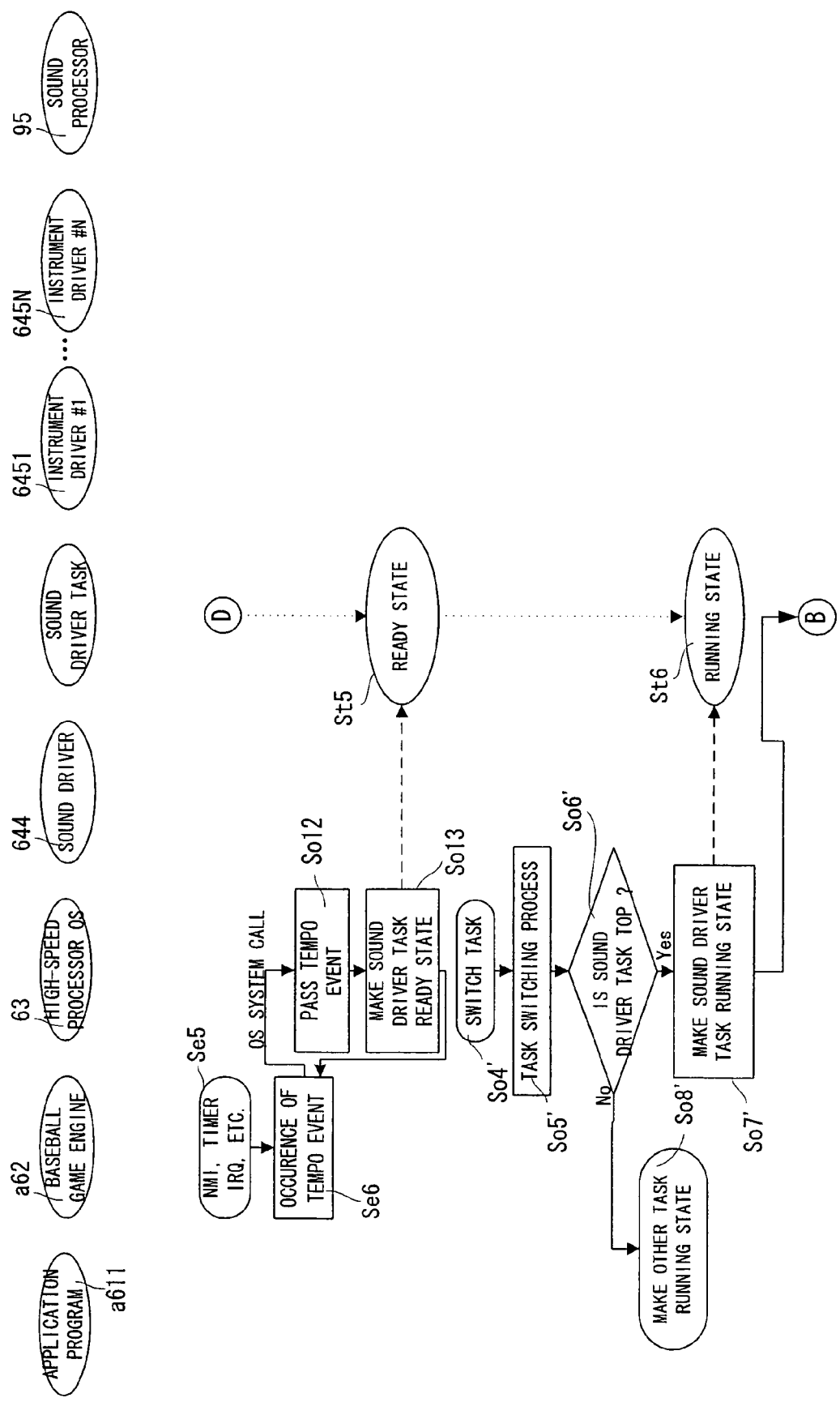
FIG. 17 is a flowchart showing a third procedure of from sound driver start-up to BGM reproducing.

In the case of FIG. 17, the tempo event is under control of baseball game engine a62. If a tempo event occurs (Se6), the baseball game engine a62 issues a system call of a tempo event occurrence and notifies the high-speed processor operating system 63 of tempo event passage (So12). Receiving this, the high-speed processor operating system 63 transits the sound driver task from the waiting state to the ready state and puts it to the last end of the queue (So13).

Figure 18:
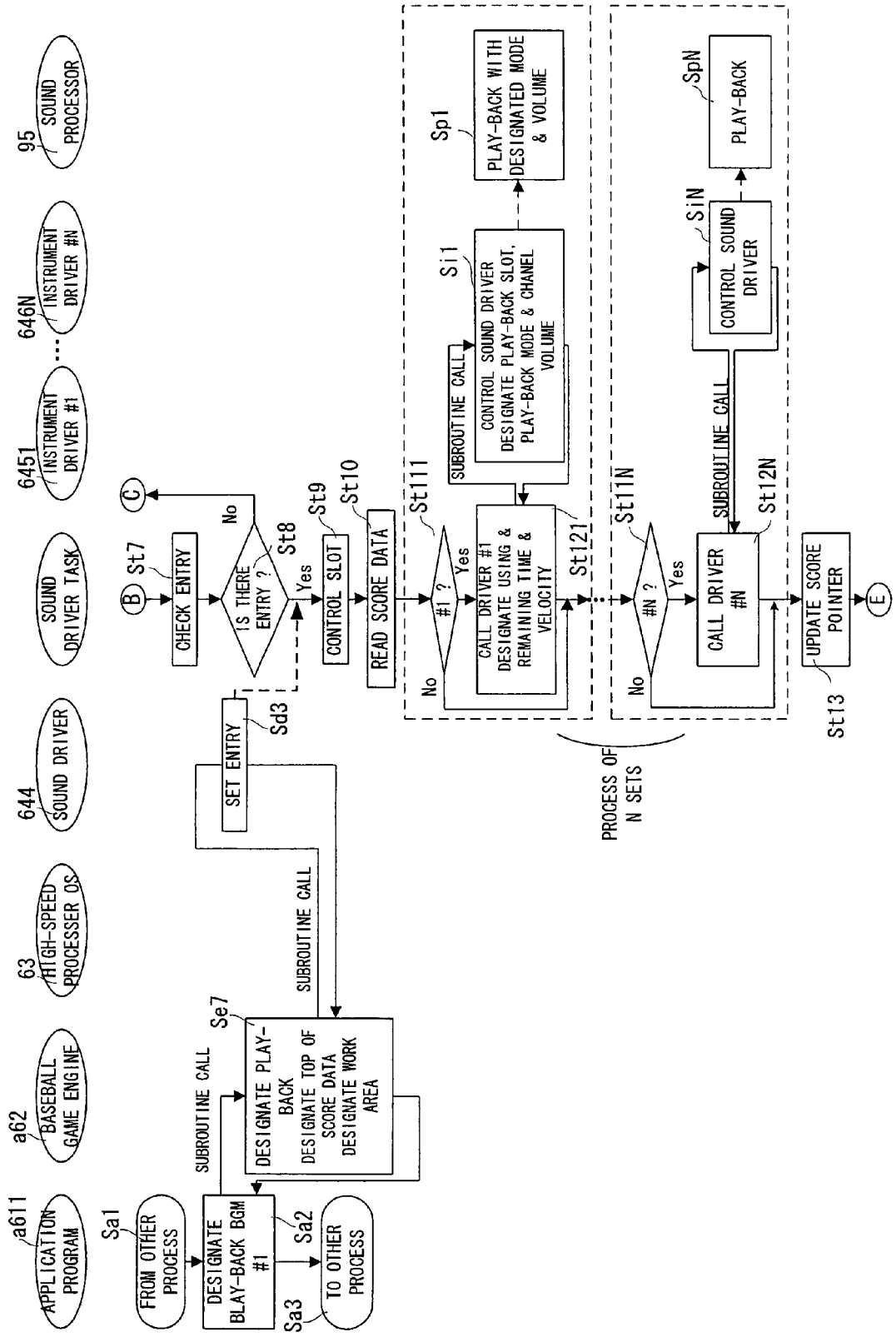
FIG. 18 is a flowchart showing a fourth procedure of from sound driver start-up to BGM reproducing.

In the case of FIG. 18, the baseball game application program a611 performs an instruction to start BGM reproducing by calling a subroutine in the baseball game engine a62 (Sa2). When calling the subroutine, the number of BGM to be reproduced is delivered as an input argument to the baseball game engine a62. In this example, instruction is made to start reproducing of BGM#1.

Receiving the instruction to start BGM#1 reproducing from the baseball application program a611, the baseball game engine a62 calls a subroutine in the sound driver 644, and delivers, as an input argument to sound driver 644, a score data top address of BGM#1 and a designation of an work area to be used in reproducing BGM#1 by the sound driver 644 (Se7).

The subroutine in the sound driver 644 thus called sets the BGM#1 reproducing start in an entry (Sd3), then ending the subroutine. Here, the central processor 93 execution returns to the baseball game engine a62. Thereafter, the baseball engine a62 ends the subroutine, and the central processor 93 execution returns to the baseball game application program a611.

When the central processor 93 execution returns to the baseball game application program a611, then the baseball game application program a611 is allowed to proceed to a next process (Sa3).

When the sound driver task undergoes tempo event passage and enters into a running state, it first checks the entry (St7). If no entry is set herein, the sound driver task ends the current-time process and issues a system call to wait a next tempo event, entering to a waiting state.

Confirming an entry to start BGM producing or confirming that BGM is now under producing, the sound driver task performs a slot control process (St9). At first, confirmation is made on the number of slots to be used for current-time reproducing. Where the number of vacant slots is smaller than that, the slots in a reproducing state are newly assigned as reproducing slots in the order of lower priority. Herein, the lower priority refers to such slots that reverberation sound is being reproduced. The slots now under music instrument reproducing are set by a lower priority in the order of earlier starting of reproducing.

Thereafter, the sound driver task reads out score data based on a score data pointer being set (St10) and interprets the score data thus read out.

According to the interpreted score data, the sound driver 644 makes calls, in order, the instrument drivers 645 that reproducing is to be made in the current-time process. The instrument driver 645 provides its function as a subroutine to the sound driver 644.

The sound driver 644 when calling an instrument driver #1 delivers, as an input argument number, designation of a slot to be assigned to the instrument driver #1, designation of the number of remaining unreproduced events and designation of a velocity to the instrument driver #1 (St121). Here, velocity represents, for example, piano-keyboard tapping intensity, guitar-string plucking intensity, etc., which is to be ultimately reflected on a reproduced waveform and volume on a sound channel.

The instrument driver #1 thus called controls the sound processor 95 according to the input argument. The sound processor 95 is controlled through a control register built in the sound processor 95 and parameter table delivered via the internal memory 96. The instrument driver #1 performs control of a slot assigned to itself, designation of a reproduce mode, designation of channel volume, and so on (Si1).

The sound processor 95 performs sound channel reproducing according to control from the instrument driver 645 (Sp1, Sp2, ..., SpN).

The sound driver 644 similarly performs a determination whether to reproduce for an instrument driver #2, ..., #N or not (St112, ..., St11N) and, when to reproduce, control of each instrument driver (St122, ..., St12N).

After ending the calls to all the instrument drivers that reproducing is to be made in the current-time event process, the sound driver 644 updates the score data pointer (St13) and issues a system call to wait a next-time tempo event, makes a transition to a waiting state.

According to the above procedure, it is satisfactory for the baseball game application program a611 in BGM reproducing to merely give an instruction to start reproducing. That is, a music can be reproduced by a simple process, thereby facilitating program preparation.

Second Embodiment

Figure 19:
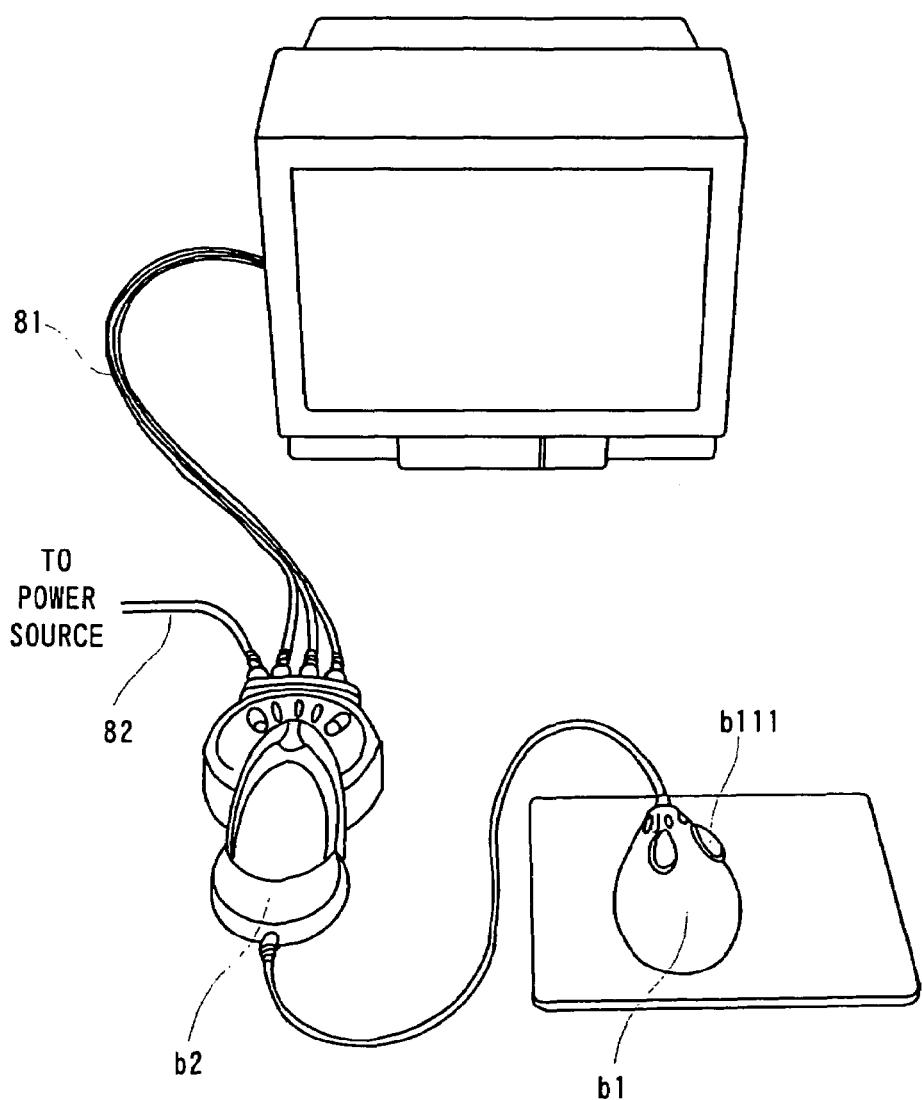
FIG. 19 is an illustrative view showing a system configuration of a drawing apparatus according to a second embodiment.

Embodiment 2 is to implement drawing on a screen of a home TV set through manipulation of a mouse by a user. Referring to FIG. 19, a drawing apparatus of this embodiment is structured by a main body b1 and an attachment device b2 for supplying power.

The user can use the present apparatus by connecting to a home TV set with using an AV cable 81 and by connecting between the main body b1 and the attachment device b2 through a cable. Power is supplied through an AC adapter 82 connected to the attachment device b2.

The user may move or slide the main body b1 as a mouse on a flat surface, e.g. on a desk, and operate two key switches b111 on the main body b1, thereby providing an input.

Figure 20:
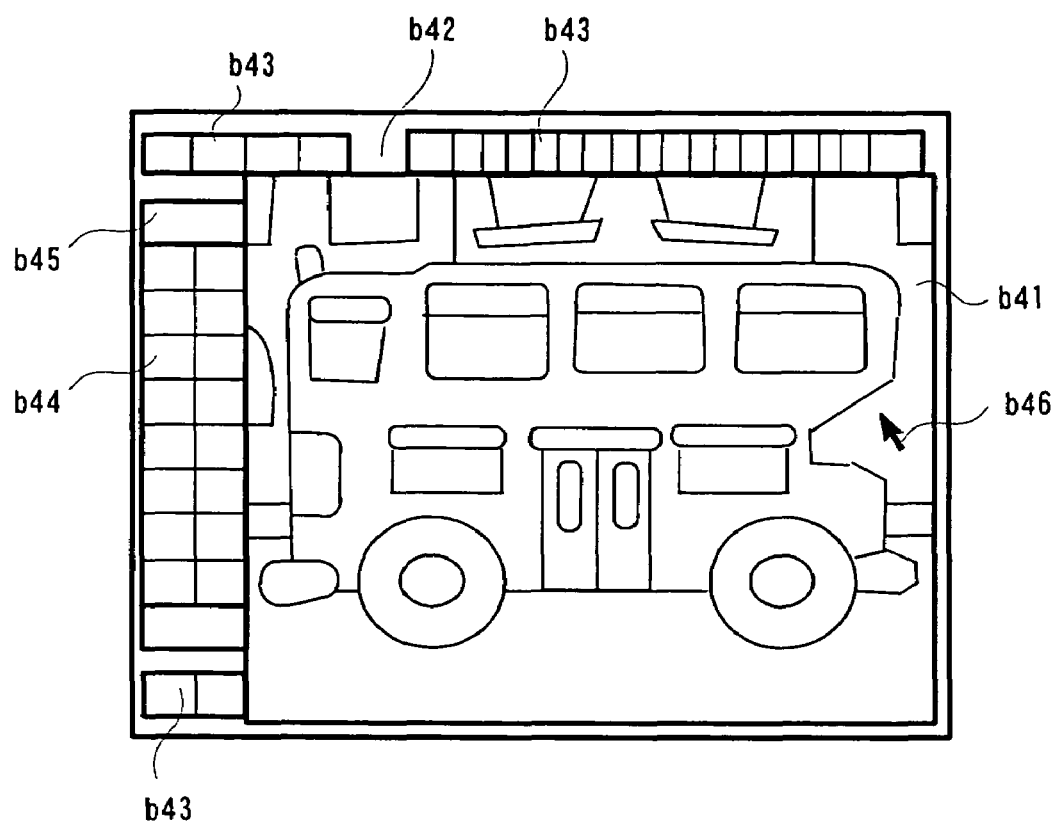
FIG. 20 is an illustrative view showing a main scene as a display example on the drawing apparatus.

In an example of display shown in FIG. 20, there are displayed on a main screen a drawing area b41, a frame b42 and various icons b43. Also, a mouse pointer b46 is displayed, which makes an corresponding movement over the screen to a movement of the main body b1.

The drawing apparatus has, as auxiliary functions, a function of developing on the drawing area b41 a background scene of image data previously stored in a ROM b12 of the main body b1, a function of putting a sticker to the drawing area b41 and an animation sticker function that a sticker is to be expressed as a motion image.

The sticker is displayed in the sticker icon in the left end of the screen. A switch icon b45 placed at above the sticker icon b44 is to switch a list of the sticker icon b44. The user can put a sticker to the drawing area b41 by dragging a sticker icon b44 with using the mouse pointer b46.

Meanwhile, the drawing apparatus in the embodiment is characterized in that it is possible to freely enlarge/reduce/rotate/flip a sticker before being put to the drawing area b41. To flip means inversion as if an image was reflected upon a mirror, wherein in the present drawing flipping is possible in a horizontal or vertical direction.

Figure 21:
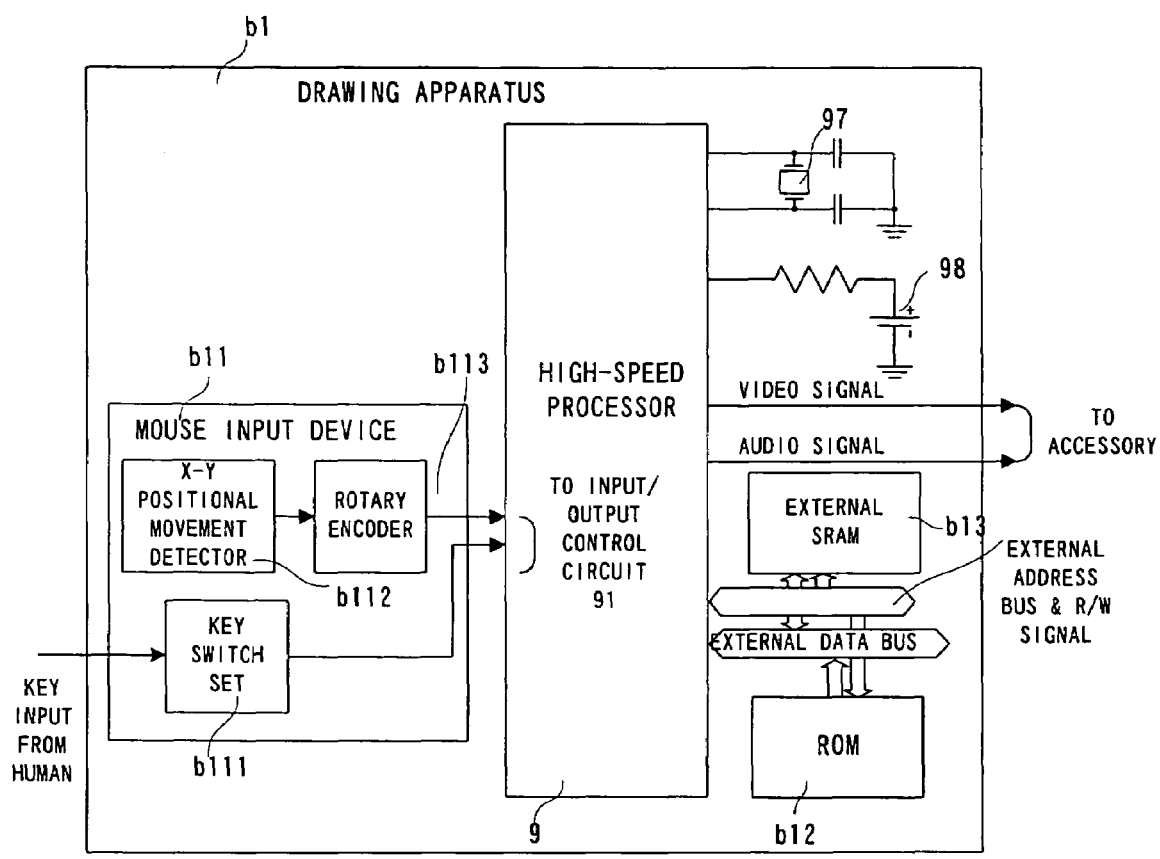
FIG. 21 is a block diagram showing an electrical configuration of the drawing apparatus.

FIG. 21 is a block diagram showing an electrical configuration of this embodiment. The main body b1 is configured by a mouse input device bill, a high-speed processor 9, a ROM 12 and an external SRAM b13. Also, the mouse input device b11 is structured by an X-Y positional movement detector b112, a rotary encoder b113 and a key switch set b111. The high-speed processor 9 requires an oscillation circuit configured by a quartz oscillator 97 or the like. In this embodiment, a battery 98 is provided to back up the data of the SRAM forming part of an internal memory 96 of the high-speed processor 9 and of the external SRAM b13.

Here, the mouse input device b11 corresponds to the man-machine interface 1, the ROM b12 and external SRAM b13 to the semiconductor memory 2, and the high-speed processor 9 to the information processor 3.

The mouse input device b11 is to detect a movement of the main body b1 made by the user and key operation through the key switch b111, and convert them into an electrical signal. The movement of the main body b1 on a flat plate, such as on a desk, by the user is detected as a signal representative of an amount of orthogonal X-Y bi-axial movement by the X-Y positional movement detector b112. The detected signal is converted into digital data representative of a direction and amount of movement with respect to the X-axis and Y-axis by the rotary encoder b113, and delivered to an input/output control circuit 91 of the high-speed processor 9. Also, the key input made by the user is converted into a signal representative of binary ON/OFF by the key switch set b111, and delivered to the input/output control circuit 91 of the high-speed processor 9. The input/output control circuit 91 under control of the central processor 93 delivers the digital data representative of movement direction and amount and the signal given from the key switch set b111 to the central processor 93.

The ROM b12 stores the modules of software to drive the high-speed processor 9. The external SRAM b13 is used to store and save image data of the drawing area b41, and as a working area to enlarge, reduce or rotate a sticker. The ROM b12 and the external SRAM b13 are connected, both as external memories for the high-speed processor 9, to an external bus for the high-speed processor 9.

The high-speed processor is similar to that as disclosed in Japanese Patent Laid-open No. H10-307790, as described before. The use of the high-speed processor realizes a high performance system with a small circuit scale. This makes it possible to arrange the man-machine interface 1, semiconductor memory 2 and information processor 3 within a single apparatus.

Figure 22:
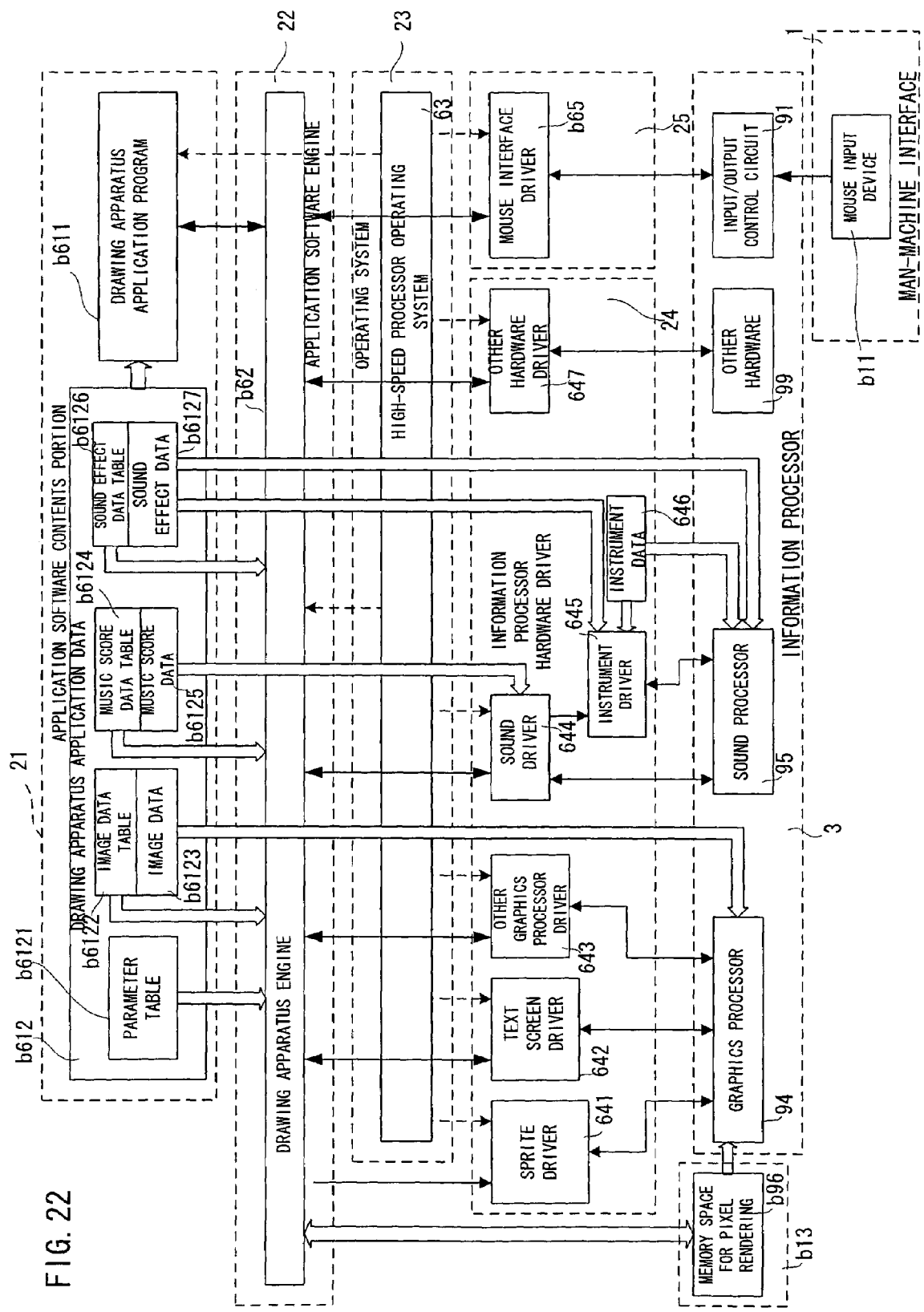
FIG. 22 is a function block diagram showing a schematic module configuration of the drawing apparatus.

FIG. 22 shows a modular configuration including software and hardware of the drawing apparatus of this embodiment. In FIG. 22, all the modules are shown in configuration including their software and hardware as seen from software to be executed on the central processor 93 of the high-speed processor 9.

A drawing apparatus application program b611 and drawing apparatus application data b612 of FIG. 22 correspond to the contents portion 21. Here, the drawing apparatus application program b611 corresponds to the contents program 211 while the drawing apparatus application data b612 to the contents data 212. The drawing apparatus application data b612 is configured by a parameter table b6121, an image data table b6122, image data b6123, a music score data table b6124, music score data b6125, an sound effect data table b6126 and sound effect data b6127.

A drawing apparatus engine b62 corresponds to the engine 22. A high-speed processor operating system 63 corresponds to the operating system 23.

To the hardware driver 24 correspond a sprite driver 641, text screen driver 642, other-graphics processing driver 643, sound driver 644, instrument driver 645, instrument data 646 and other-hardware driver 647. Among them the instrument data 646 corresponds to the driver data 242 while the other modules to the driver program 241.

A mouse interface driver b65 corresponds to the interface driver 25. The graphics processor 94, sound processor 95, input/output control circuit 91 and other hardware 99 are hardware modules included in the high-speed processor 9. Also, a memory space for pixel rendering b96 is part of a space of the external SRAM b13.

All the modules corresponding to the contents portion 21, engine 22, operating system 23, hardware driver 24 and interface driver 25 are previously stored within the ROM b12. Note that part of the program codes included in these modules are to be developed over the internal memory 96 of the high-speed processor 9 in order to run software at high speed.

The drawing apparatus application program b611 administers overall operation control, title display, drawing mode selection, drawing data saving, appreciation mode execution, and so on. Here, the drawing apparatus has drawing modes including a background scene-colored mode, a line-drawing-only mode, a background scene erasable mode and a background scene non-erasable mode. Totally four drawing modes are prepared with a combination of these modes.

The parameter table b6121 is a set of values to be substituted into parameters during arithmetic operation e.g. data to represent an animation pattern. The parameter table b6121 is accessed from the drawing apparatus application program b6111 and/or drawing apparatus engine b62.

The image data table b6122 is a table representative of a site storing the image data b6123. The image data table b6122 is accessed from the drawing apparatus application program b6111 and/or drawing apparatus engine b62, and used to notify a site storing the image data b6123 to the graphics processor 94.

The image data b6123 is a set of image data to be used in the drawing apparatus, and includes image data, such as a background scene, frame, icon, mouse pointer, sticker, and so on. The image data b6123 includes both of a part to be directly accessed from the graphic processor 94 and a part to be used as an original image when the drawing apparatus engine b62 performs enlargement/reduction/rotation of a sticker.

The music score data table b6124 is a table representative of a site storing the music score data b6125. The music score data table b6124 is accessed from the drawing apparatus application program b6111 and/or drawing apparatus engine b62, and used to notify a site storing the music score data b6125 to the sound driver 644.

The music score data b6125 is a set of music score data of melodies to be used in the drawing apparatus software. The music score data b6125 is accessed from the sound driver 644.

The sound effect data table b6126 is a table representative of a site storing the sound effect data b6127. The sound effect data table b6126 is accessed from the drawing apparatus application program b6111 and/or drawing apparatus engine b62, and used to notify a storage site of the sound effect data b6127 to the instrument driver 645 and sound processor 95.

The sound effect data b6127 is a set of waveform data and envelop data of an effect sound or the like to be used in the drawing apparatus software. The sound effects include, for example, a sound effect to be played during drawing and a sound effect during icon selection. The waveform data in the sound effect data b6127 is to be accessed from the sound processor 95 while the envelop data or the like is from the instrument driver 645 and/or sound processor 95.

The drawing apparatus engine b62 administers particular processing for the drawing apparatus software among the regular processing required in the drawing apparatus software. Specifically, the processing includes, for example, geometrical figure drawing, sticker processing, motion image animation control, sound control and input control. The drawing apparatus engine b62 is utilized in function according to a subroutine call or task creation from the drawing apparatus application program b611.

The high-speed processor operating system 63 herein is same as that of the first embodiment. The high-speed processor operating system 63 administers state control of all the tasks included in the drawing apparatus application program b611, drawing apparatus engine b62, sprite driver 641, text screen driver 642, other-graphics processing driver 643, sound driver 644, other-hardware driver 647 and mouse interface driver b65.

The modules corresponding to the hardware driver 24 uses those modules as used in the first embodiment. Note that among these modules the sprite driver 641, text screen driver 642, other-graphics processing driver 643, sound driver 644 or other-hardware driver 647 are utilized in function according to a subroutine call or task creation from the drawing apparatus engine b62.

The mouse interface driver b95 receives an output from the mouse input device b11 as the man-machine interface 1 through the input/output control circuit 91 of the high-speed processor 9, and delivers it to the drawing apparatus engine b62. Here, the mouse interface driver 95 abstracts the mouse input device b11 hardware and supplies a program interface for handling this input means with simplicity to the drawing apparatus engine b62.

The external SRAM b13 has an area to store sticker image data processed of enlargement/reduction/rotation, and an area to store and save drawing-area image data. The image data of the sticker, before being put onto the drawing area, is read out as sprite by the graphic processor 94 while the image data of the drawing area is read out as a text screen by the graphics processor 94.

Figure 23:
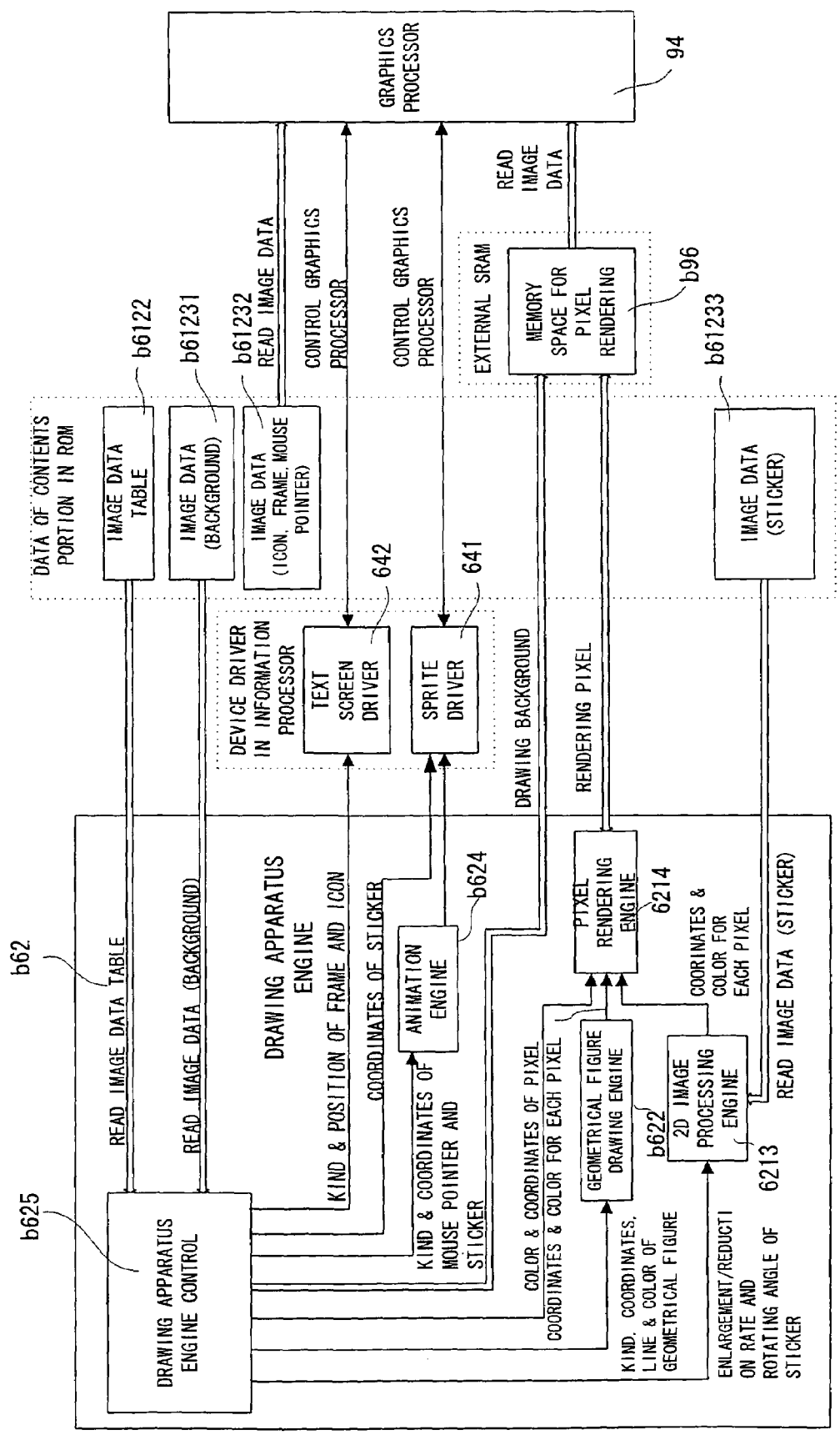
FIG. 23 is a function block diagram showing a configuration when putting the eye on graphics processing in the drawing apparatus engine.

FIG. 23 shows a schematic diagram showing a configuration of various sections when putting the eye on graphics processing by the drawing apparatus engine b62. As shown in FIG. 23, the drawing apparatus engine b62 includes an animation engine b624, a geometrical figure drawing engine b622, a 2D image processing engine a6213 and a pixel rendering engine a6214. The drawing apparatus engine b62 is provided also with a drawing apparatus engine control b625. Herein, the 2D image processing engine a6213 and pixel rendering engine a6214 are respectively same as the 2D image processing engine a6213 and pixel rendering engine a6214 of Embodiment 1.

Descriptions will be herein made separately on processing of a background scene, processing of an icon, frame, mouse pointer and animation sticker, processing of sticker enlargement/reduction/rotation, processing of geometrical figure drawing, free curved line drawing and painting out. The functions of the related sections in processing are also described.

In a background scene processing, the drawing apparatus engine control b625 first reads information representative of a site storing background scene image data out of the image data table b6122, in order to write background scene image data to the rendering memory space b96 of the external SRAM b13. The drawing apparatus engine control b625 also reads background scene image data out of the image data (background scene) b61231 according to the read-out information representing a storage site, and directly writes the read-out image data onto the rendering memory space b96 of the external SRAM b13.

In processing of an icon, frame, mouse pointer and animation sticker, the drawing apparatus engine control b625 reads information representative of a site storing image data out of the image data table b6122, in order to display a frame and icon as a text-screen character or a mouse pointer and animation sticker as sprite. The drawing apparatus engine control b625 delivers information representative of a kind and position of the frame and icon to the text screen driver 642, and information representative of kind and coordinate of the mouse pointer and animation sticker to the animation engine b624.

The text screen driver 642 administers such processing as text-screen coordinate offset control, character priority control, character rewriting and character color control, based on the information received from the drawing apparatus engine control b625.

The animation engine b624 reads out data representative of an animation pattern stored in the parameter table b6121 based on the information received from the drawing apparatus engine control b625 and current mouse pointer/animation sticker status, and calculates an animation pattern for the mouse pointer/animation sticker for next renewal of screen and delivers it together with coordinate information to the sprite driver 641.

The sprite driver 641 administers such processing as sprite coordinate control, sprite number assignment control, sprite display priority control, sprite color control, sprite data transfer control and variable-size sprite display, in order to display a mouse pointer and animation sticker.

The graphic processor 94 reads image data out of the image data (icon, frame, mouse pointer) b61232 and creates an image of a text screen and sprite.

In a process of sticker enlargement/reduction/rotation, the drawing apparatus engine control b625 calculates a sticker coordinate, enlargement/reduction ratio and rotation angle, according to an output received through the mouse interface driver b95 from the user. The calculated sticker coordinate is delivered to the sprite driver 641, and the sticker enlargement/reduction ratio and rotation angle are to the 2D image processing engine a6214. The sprite driver 641 administers such processing as sprite coordinate control, sprite number assignment control, sprite display priority control, sprite color control sprite data transfer control and variable-size sprite display, in order to display the sticker as sprite.

The 2D image processing engine a6214 receives the sticker enlargement/reduction ratio and rotation angle from the drawing apparatus engine control b625, and reads sticker original image data out of the image data (sticker) (b61233) to thereby determine image data of an enlarged/reduced/rotated sticker through operation. The calculation result is delivered in a coordinate and color information form on a pixel-by-pixel basis to the pixel rendering engine a6213.

The pixel rendering engine a6213 receives the coordinate and color information on a pixel-by-pixel basis from the 2D image processing engine a6214, and calculates an each-pixel address and bit position in a memory space, thereby writing designated color information onto the rendering memory space b96.

The graphic processor 94 reads image data for the enlarged/reduced/rotated sticker out of the rendering memory space b96 according to control from the sprite driver 641, and creates a sprite image.

Next, descriptions will be made on processing of geometrical figure drawing, free curved line drawing, painting-out drawing and the like, as well as functions in the related sections. In this embodiment the geometrical figure means a figure such as a straight line or circle while the free curved line is a line depicted as tracing a path of the mouse pointer. Also, the painted out drawing refers to a process of painting out an earlier enclosed by a line segment with particular color or image pattern.

The drawing apparatus engine control b625 calculates a geometrical figure kind, coordinate, line kind and color information according to an input received through the mouse interface driver b95 from the user, and delivers them to the geometrical figure drawing engine b622. The drawing apparatus engine control b625 also calculates each pixel coordinate and color information to be rendered in free curved line drawing/painting-out drawing similarly according to an input from the user, and delivers them to the pixel rendering engine a6214.

The geometrical figure drawing engine b622 makes processing to draw a geometrical figure, such as a straight line or circle. The geometrical figure drawing engine calculates a coordinate and color information on a pixel-unit basis from a geometrical figure kind, coordinate, line kind and color information received from the drawing apparatus engine control b625, and delivers them to the pixel rendering engine a6214.

The pixel rendering engine a6214 performs a rendering process on image data to the drawing area. The pixel rendering engine receives coordinates and color information on a pixel-by-pixel basis of the geometrical figure from the geometrical figure rendering engine b622 and of the free curved line or painting-out process from the drawing apparatus engine control b625, and calculates each-pixel address and bit position in the memory space, thereby writing designated color information onto the rendering memory space b96.

The graphics processor 94 reads image data of the drawing area b41 out of the rendering memory space b96 according to control from the text screen driver 642, and creates an text screen image.

Third Embodiment

A home information terminal according to a third embodiment has a function to transmit and receive a program and data through an analog public line. The received program and/or data are processed in a high-speed processor 9 based on a key and sound input from a user on a home information terminal side. Thus, video and audio signals are outputted onto a home TV set. This terminal is well suited for home banking service, shopping, stock dealing, games, etc. using a network.

Figure 24:
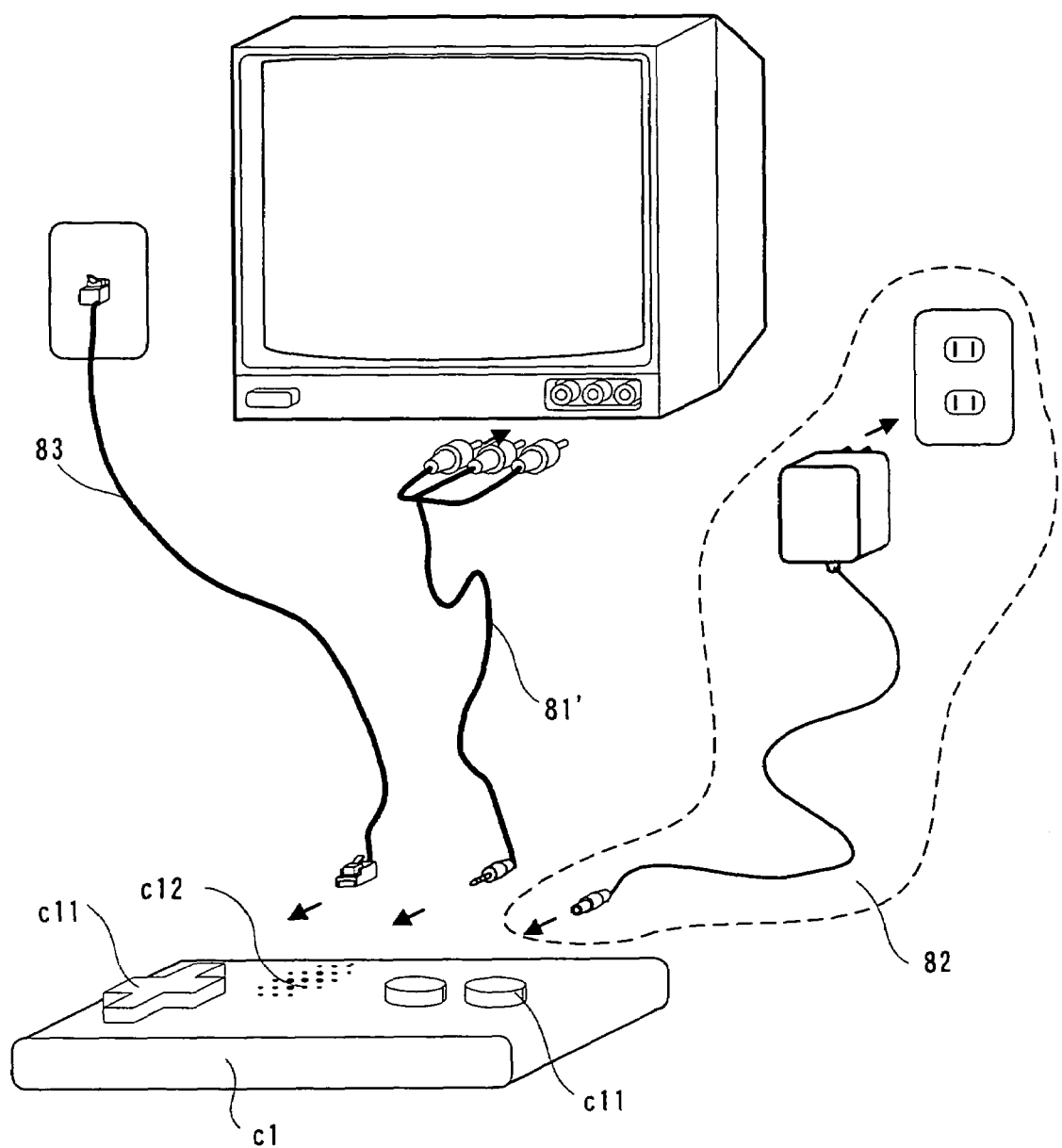
FIG. 24 is an illustrative view showing a system configuration of a home information terminal according to a third embodiment.

Referring to FIG. 24, a home information terminal in this embodiment is structured only by a main body c1. The user may connect the main body c1 to a home TV set by using an AV table 81, and to a telephone line modular jack by using a modular cable 83. Power is supplied from a dry cell (not shown) accommodated in the main body c1 or through an AC adapter 82 connected to the main body c1. The user can operate to select a menu and input data by using a key switch set c11, and input a sound through using a microphone c12.

Figure 25:
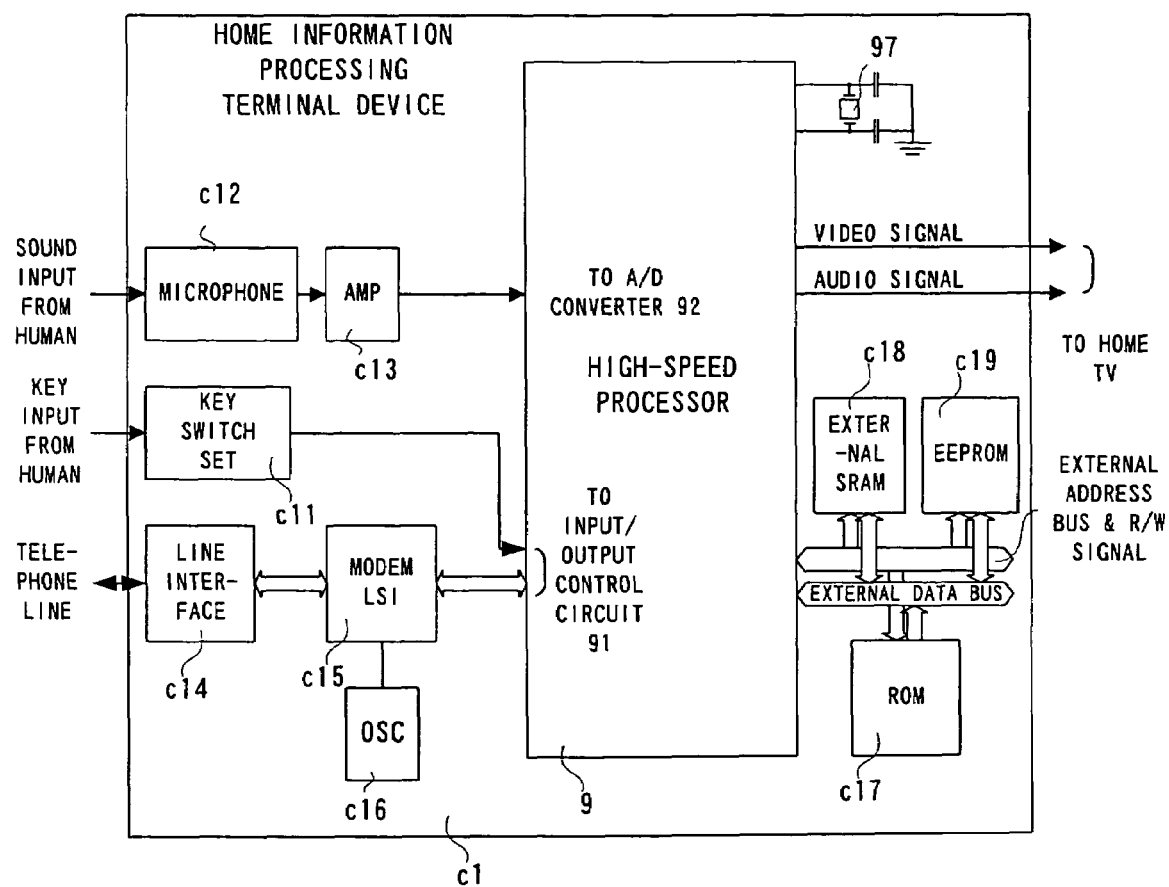
FIG. 25 is a block diagram showing an electrical configuration of the home information terminal.

FIG. 25 is a block diagram showing an electrical configuration of this embodiment. The main body c1 is configured by a microphone c12, an amplifier circuit c13, a key switch set c11, a ROM c17, an external SRAM c18, an EEPROM c19, a high-speed processor 9, a modem LSI c15 and line interface c14. Also, the high-speed processor 9 and the modem LSI c15 require respective oscillation circuits configured by a quartz oscillator 97 or the like.

Here, the microphone c12 and key switch set c11 correspond to the man-machine interface 1. The ROM c17, external SRAM c18 and EEPROM c19 correspond to the semiconductor memory 2 while the high-speed processor 9 to the information processor 3.

The sound input from a user is converted into an analog voltage signal by the microphone c12 and then amplified in voltage amplification by the amplifier circuit c13, thus being inputted to an A/D converter 92 of the high-speed processor 9. The A/D converter 92 converts the input analog voltage signal into digital data under control of the central processor 93, and delivers the converted data to the central processor 93.

The key input from the user is converted into a signal representative of binary ON/OFF by the key switch set c11 and then inputted to the input/output control circuit 91 of the high-speed processor 9. The input/output control circuit 91 delivers the input data to the central processor 93 based on control from the central processor 9.

The ROM c17 previously stores modules not to be obtained through communication, among the modules included in the software for driving the high-speed processor 9.

The external SRAM c18 stores modules to be obtained through communication, among the modules included in the software for driving the high-speed processor 9. The external SRAM may be used as a software working area or for the purpose of temporarily storing an execution proceeding.

The EEPROM c19 is a non-volatile semiconductor memory capable of electrically writing and erasing data, and to store information such as user's personal information, transaction records and passwords.

The ROM c17, the external SRAM c18 and the EEPROM c19 are connected as external memories for the high-speed processor 9 to an external bus of the high-speed processor 9.

The high-speed processor c13 in this embodiment is similar to that as disclosed in Japanese Patent Laid-open No. H10-307790. The use of this processor realizes a high performance system with a small circuit scale. It is therefore possible to arrange the man-machine interface 1, the semiconductor memory 2 and information processor 3 within a single apparatus.

The modem LSI c15 is to transmit and receive a program and data through an analog public line. The model LSI 25 has functions of modulating digital data into an analog signal to be transmitted, and of demodulating an analog signal into digital data to be received. It is preferred that the communication rating including a modulation scheme uses an existing standardized rating. Also, the modem LSI c15 is desirably incorporates therein a micro-controller to control communication or the like.

The line interface c14 has a function as a line control circuit (NCU), and has a telephone-line conversion circuit between 2 lines and 4 lines and an impedance matching circuit.

Figure 26:
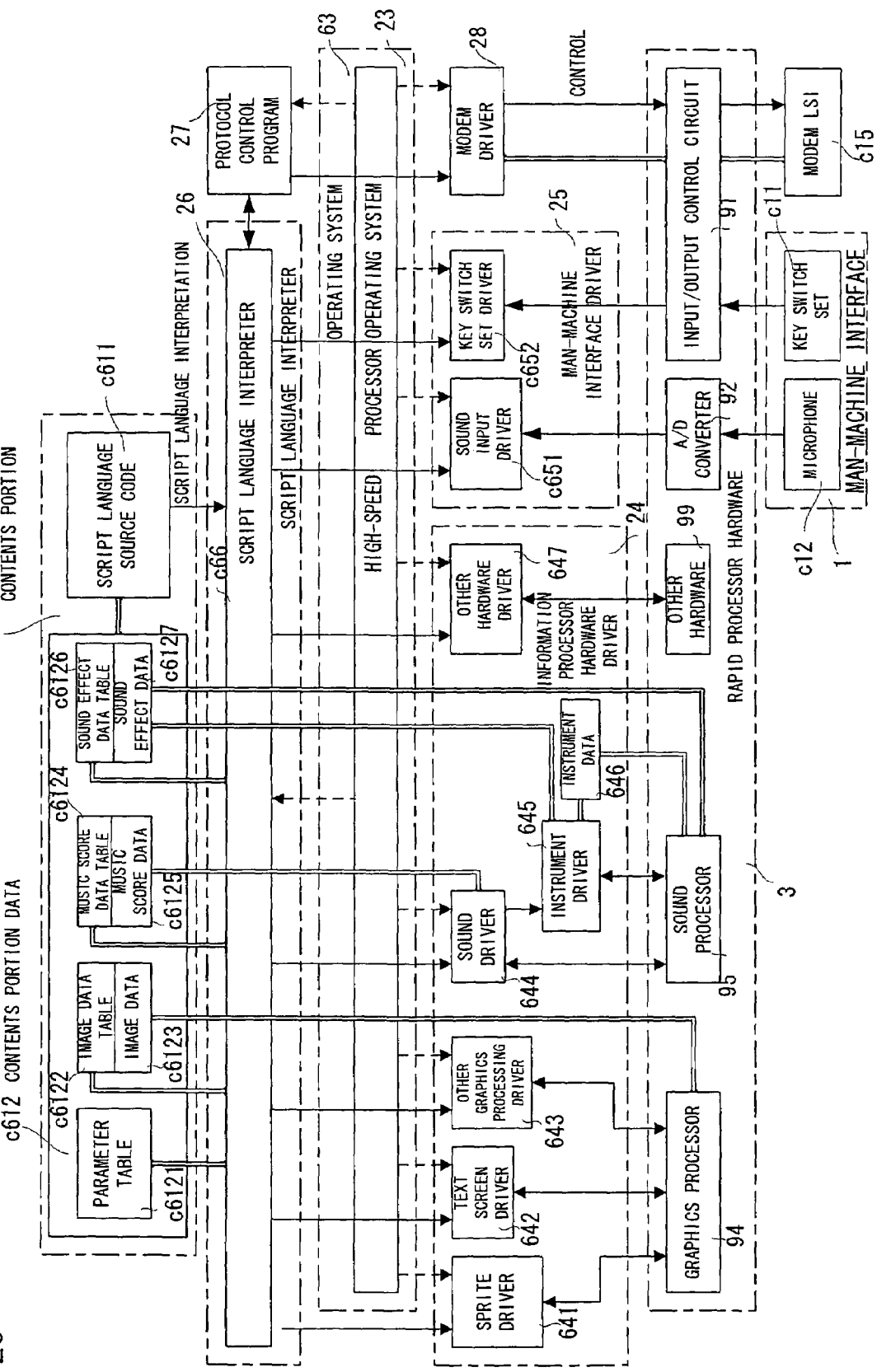
FIG. 26 is a function block diagram showing a schematic module configuration of the home information terminal.

FIG. 26 shows a schematic module configuration of the home information terminal. In FIG. 26, all the modules are illustrated in configuration including software and hardware as seen from the software to be run on the central processor 93 in the high-speed processor 9.

In FIG. 26, a script language source code c611, parameter table c6121, image data table c6122, image data c6123, music score data table c6124, music score data c6125, sound effect data table c6126 and sound effect data c6127 correspond to contents portion 21'. Among them the script language source code c611 corresponds to the script language source code portion 211' while all the other modules to the contents data 212'.

The script language interpreter c66 corresponds to the script language interpreter 26. The high-speed processor operating system 63 corresponds to the operating system 23.

A sprite driver 641, text screen driver 642, other-graphics processing driver 643, sound driver 644, instrument driver 645, instrument data 646 and other-hardware driver 647 correspond to the hardware driver 24. Among them the instrument data 646 corresponds to the driver data 242 while the other modules to the driver program 241.

A sound input driver 651 and key switch set driver 652 correspond to the interface driver 25.

A graphic processor 94, sound processor 95, A/D converter 92, input/output control circuit 91 and other hardware 99 correspond to the hardware modules included in a high-speed processor 9.

The script language source code c611 is a program code described in a script language, and to administer processing for an objective of this apparatus. For example, in a case that this terminal is used as a home banking apparatus, the script language source code administers basic functions including balance inquiry and transfer, and extension functions including on-line shopping and household accounts. When required, it makes access to a corresponding module to the contents data 212'.

The modules corresponding to the contents data 212' is basically in the same configuration as that of embodiments 1 and 2. However, there is herein no necessity to arrange all the modules shown in the figure at all times. Also, the module may have a unique configuration suited to be processed by a script language source code c611 acquired through communication.

The module corresponding to the contents portion 21', although basically obtainable through communication, may includes a part previously stored within the ROM c17. For the above-mentioned home banking apparatus as an example, it is preferred to previously store such programs and data as required for basic functional processes of menu select processes and initial settings needed as an application in the ROM c17.

The script language interpreter c66 is to sequentially convert the script language source code c611 described in the script language into an object code that can be interpreted by the central processor 93 of the high-speed processor 9.

The script language includes HTML for example. In a case that the present home information terminal is used for a purpose of acquiring contents from an Internet worldwide Web (WWW), the script language interpreter c66 should be configured to interpret HTML. However, sequential interpretation and script language execution results in increase in overhead of processing. Accordingly, where there is no necessity to interpret contents described in an existing script language, it is desired to use an exclusive script language in order to enhance efficiency in controlling the high-speed processor 9.

The high-speed processor operating system 63 is the same as that used in the first or second embodiment. The high-speed processor operating system 63 administers status controls of all the tasks included in the script language interpreter c66, sprite driver 641, text screen driver 642, other-graphics processing driver 643, sound driver 644, other-hardware driver 647, sound input driver c651, key switch set driver c652, communication protocol control program 27 and modem driver 28.

The modules corresponding to the hardware driver 24 are the same as those used in the first or second embodiment. However, among these modules, the functions of the sprite driver 641, text screen driver 642, other-graphics processing driver 643, sound driver 644 and other-hardware driver 647 are to be utilized according to a subroutine call or task creation from the script language interpreter c66.

The sound input driver c651 controls the A/D converter 92 and administers to convert an analog voltage signal inputted from the microphone c12 into digital data. The sound input driver also administers, as required, processing of the after-conversion digital data. The sound input driver c651 is utilized in function according to a subroutine call or task creation from the script language interpreter c66. The digital data converted/processed through the sound input driver c651 is delivered to the script language interpreter c66.

The key switch set driver c652 reads an input signal from the key switch set c11 through the input/output control circuit 91, and delivers information, such as key status and key ON/OFF trigger detection, to the script language interpreter c66. The key switch set driver c11 is utilized in function according to a subroutine call or task creation from the script language interpreter c66.

The communication protocol control program 27 administers processing of higher-level communication protocol upon data communications. The higher-level communication protocol includes, for example, transport layer protocol, such as packet transfer protocol (TCP) and Internet layer protocol such as Internet protocol (IP). Because lower-level communication protocol processing and modem LSI control are performed by the modem driver 28, the communication protocol control program utilizes a function of a modem driver 28 according to a task creation or subroutine call. Meanwhile, the communication protocol control program 27 receives transmission data from the script language interpreter c66, and administers to deliver the reception data to the script language interpreter c66.

The modem driver 28 administers control of the modem LSI c15 and processing of lower-level communication protocol. The lower-level communication protocol includes, for example, sub-network layer protocol such as X. 25 in data communications through Internet and link layer protocol such as point-to-point protocol (PPP).

The modem driver 28 is utilized in function according to a task creation or subroutine call from the communication protocol control program 27.

Among the modules corresponding to the contents portion 21', those obtained through communication are stored into the external SRAM c18.

Previously stored within the ROM c17 are the script language interpreter c66, the high-speed processor operating system 63, the modules 641-647 corresponding to the hardware driver 24, the modules c651, c652 corresponding to the interface driver 25, communication protocol control program 27 and modem driver 28. Also, the modules corresponding to the application software contents portion 21' is partly stored beforehand within the ROM c17.

Fourth Embodiment

A shooting game apparatus of a fourth embodiment provides a game to a user that he or she operates a light gun to shoot a target displayed on a home TV set screen.

Figure 27:
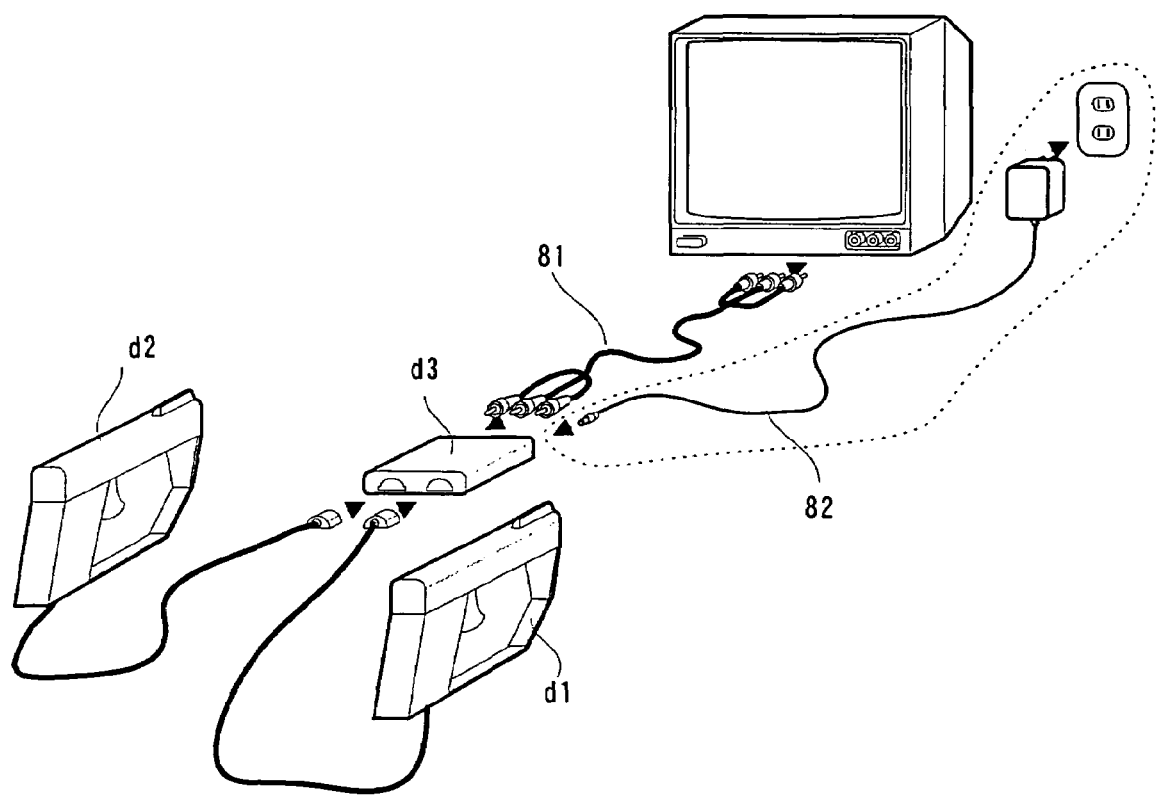
FIG. 27 is an illustrative view showing a system configuration of a shooting game apparatus according to a fourth embodiment.

The shooting game apparatus as shown in FIG. 27 is structured by two light gun type input devices d1, d2 and a main body d3.

The player can use this apparatus by connecting the main body d3 to a home TV set using an AV table 81 and the two light gun type input devices d1, d2 to the main body d3 through cables. Power is supplied from a dry cell (not shown) accommodated in a main body d3 or through an AC adapter 82 connected to the main body d3.

The player can shoot an object in the scene by use of the light gun type input devices d1, d2, thus performing menu selection, shooting at a target, etc.

Figure 28:
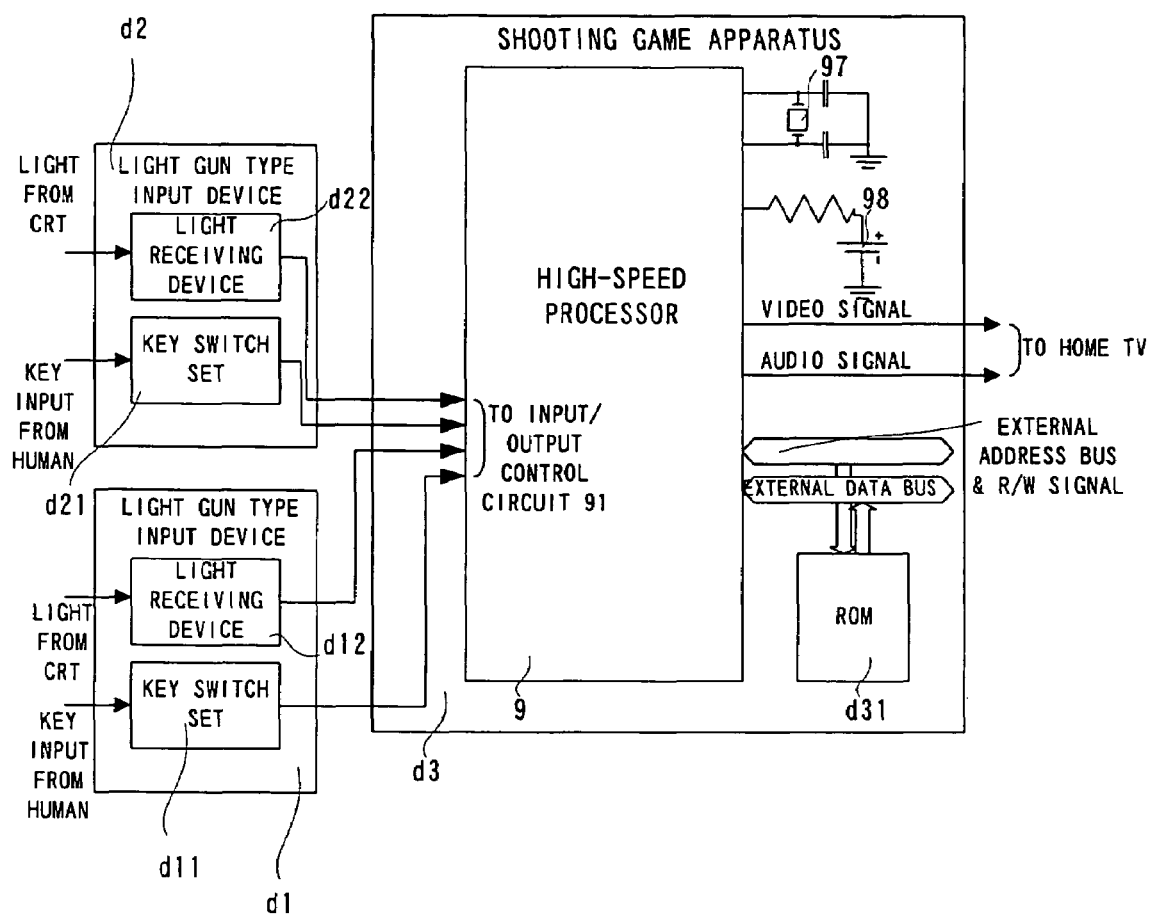
FIG. 28 is a block diagram showing an electrical configuration of the shooting game apparatus.

Referring to FIG. 28, the light gun type input devices d1, d2 are configured by light receiving devices d12, d22 and key switch sets d11, d21. The main body d3 is configured by a high-speed processor 9 and a ROM c31. The high-speed processor 9 requires an oscillation circuit configured by a quartz oscillator 97 and the like. This embodiment has a battery 98 to back up SRAM data constituting part of an internal memory 96 of the high-speed processor 9.

Here, the two light gun type input devices d1, d2 correspond to the man-machine interface 1, the ROM d31 to the semiconductor memory 2, and the high-speed processor 9 to the information processor 3.

The player's key input is converted by the key switch sets d11, d21 into a signal representative of a binary ON/OFF to be inputted to the input/output control circuit 91 of the high-speed processor 9. The input/output control circuit 91 delivers the input data to the central processor 93 based on control from the central processor 93.

Meanwhile, the light receiving devices d12, d22 receive light produced due to CRT scanning from the home TV set, and delivers timing of light reception to the graphics processor 94 of the high-speed processor 9. With the timing, an HV counter in the graphics processor 94 is latched in value so that the latched value can be read out of the central processor 93. The series of processing provides detection as to at which point on the CRT is aimed at by the light receiving elements of the light gun type input devices d1,d2.

The ROM d31 stores software modules for driving the high-speed processor 9. The ROM d31, as an external memory or the high-speed processor 9, is connected to an external bus of the high-speed processor 9.

The high-speed processor 9 of this embodiment is similar to that as disclosed in Japanese Patent Laid-open No. H10-307790, similarly to the forgoing embodiment.

The use of this processor realizes a high-performance system with a small circuit scale.

Fifth Embodiment

A karaoke apparatus in the fifth embodiment outputs video and audio signals onto a home TV set so that a user can enjoy karaoke using a microphone to output melodies and words on the screen of the home TV set.

Figure 29:
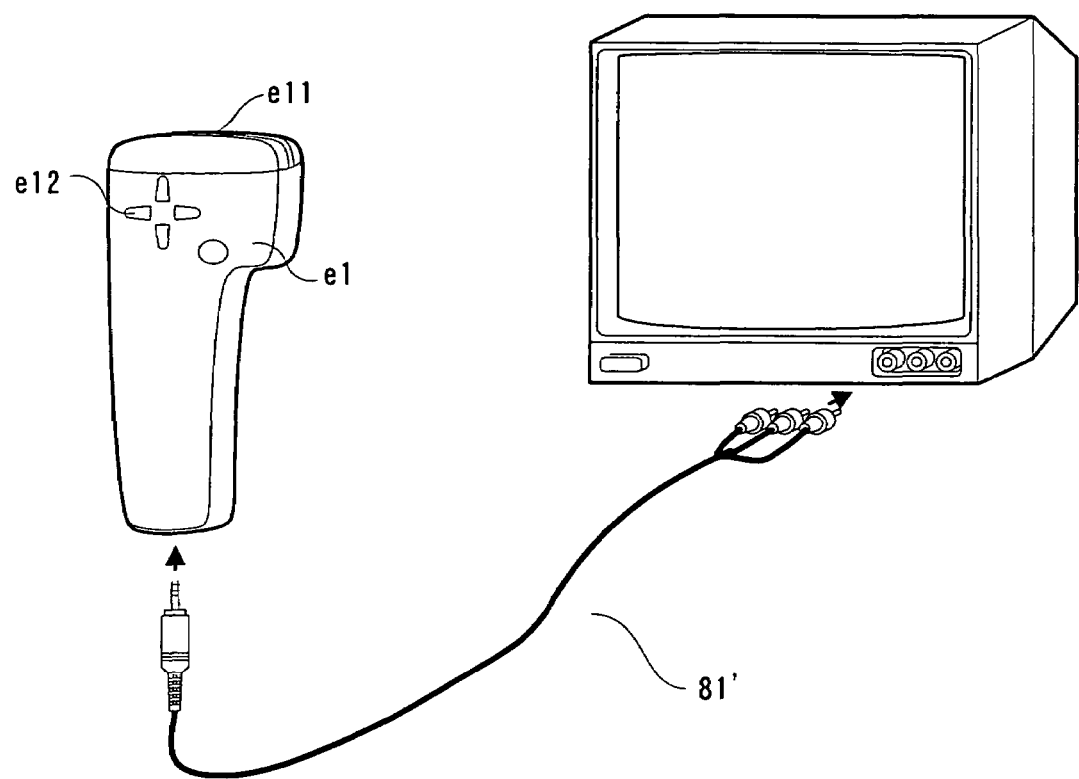
FIG. 29 is an illustrative view showing a system configuration of a karaoke apparatus according to a fifth embodiment.

The karaoke apparatus of this embodiment is structured, as shown in FIG. 29, by only a main body e1. The user can use the apparatus by connecting the main body e1 to a home TV set through using an AV cable 81'. Power is supplied from a dry cell (not shown) accommodated in the main body e1. The user of the karaoke apparatus may operate using a key switch set e12 to select a music, adjust a reproduce speed, adjust a keynote, and input a voice to a microphone e11.

Figure 30:
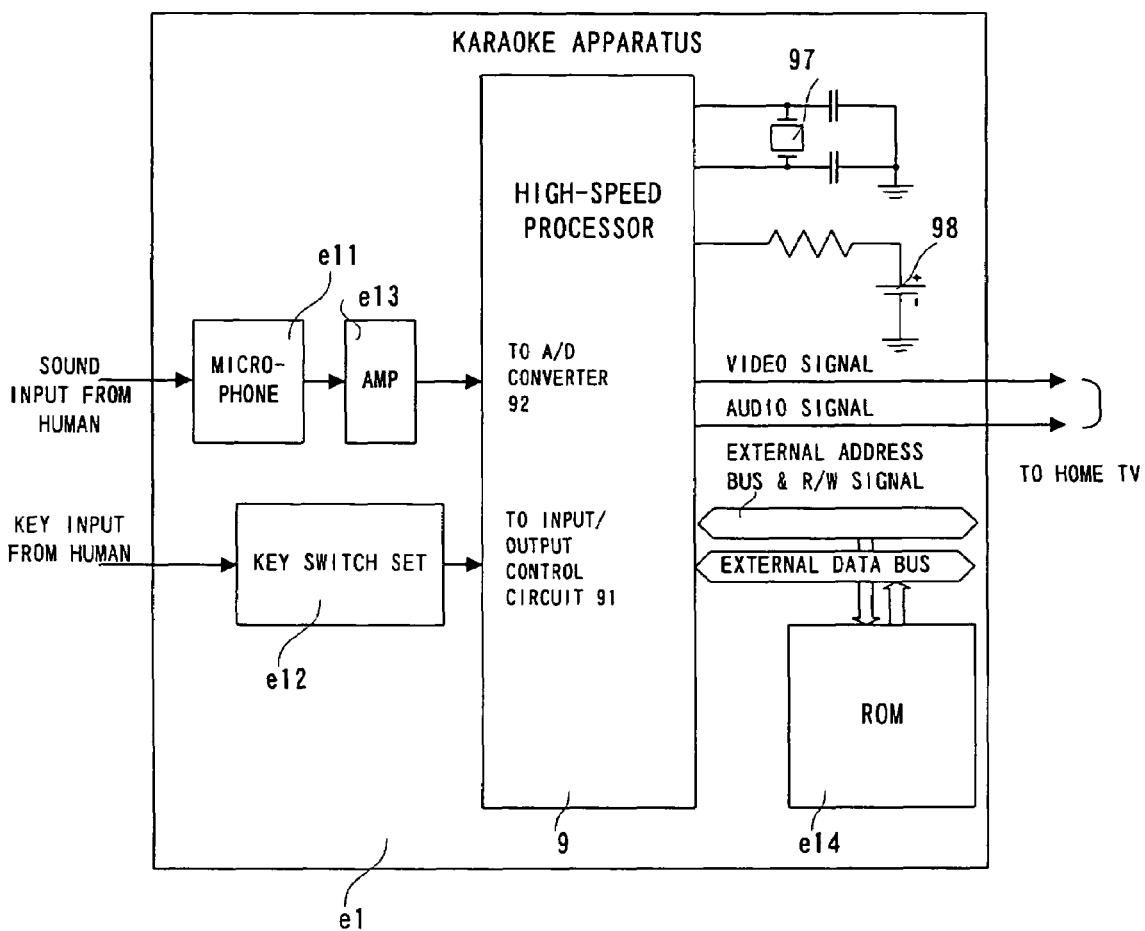
FIG. 30 is a block diagram showing an electrical configuration of the karaoke apparatus.

As shown in FIG. 30, the main body e1 is configured by a microphone e11, an amplifier circuit e13, a key switch set e12, a ROM e14 and a high-speed processor 9. The high-speed processor 9 requires an oscillation circuit configured by a quartz oscillator 97 or the like. In this embodiment, a battery 98 is provided to back up SRAM data forming part of an internal memory 96 for the high-speed processor 9.

Here, the microphone e11 and key switch set e12 correspond to the man-machine interface 1, the ROM e14 to the semiconductor memory 2, and the high-speed processor 9 to the information processor 3.

The user's voice input is converted into an analog voltage signal by the microphone e11, and then amplified in voltage amplification by the amplifier circuit e13 and inputted to an A/D converter 92 of the high-speed processor 9. The A/D converter 92 converts the input analog voltage signal into digital data based on control from the central processor 93, and delivers the converted data to the central processor 93.

The user's key input is converted into a signal representative of a binary ON/OFF, and inputted to the input/output control circuit 91 of the high-speed processor 9. The input/output control circuit 91 delivers the input data to the central processor 93 based on control from the central processor 93.

The ROM e14 stores software modules for driving the high-speed processor 9. The ROM e14, as an external memory of the high-speed processor 9, is connected to an external bus of the high-speed processor 9.

The high-speed processor 9 of this embodiment is similar to that as disclosed in Japanese Patent Laid-open No. H10-307790 mentioned before. The use of this processor realizes a high-performance system with a small circuit scale, making it possible to incorporate the man-machine interface, the semiconductor memory and the information processor 3 within a single apparatus.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information processing apparatus for outputting video and audio signals to a home TV set, comprising:

a man-machine interface, a semiconductor memory and an information processor;

said man-machine interface converting into an electrical signal one or plurality of urging force, movement in a space, sound information that are given by a human to said man-machine interface;

said semiconductor memory storing software for driving said information processor;

said software being configured by an operating system, an information processor hardware driver, a man-machine interface driver, an application software engine and application software contents portion;

said operating system administering at least state control of all the tasks included in the present software, task scheduling, shared resource control between tasks, and interrupt control;

said information processor hardware driver being to efficiently handle hardware resource in said information processor and configured by a driver program and driver data;

said driver program including totally one or more tasks and subroutines, and being to be utilized in function according to task execution or a subroutine call from said application software engine;

said driver data being a set of data to be handled by said driver program;

said man-machine interface driver being to efficiently deliver said electrical signal from said man-machine interface to said application software engine, and including totally one or more tasks and subroutines, and to be utilized in function according to task execution of a subroutine call from said application software engine;

said application software engine being to perform a process relied upon an application kind among regular processes required by said application software contents portion and including totally one or more tasks and subroutines, and utilized in function task execution or subroutine call from an application software contents program;

said application software contents portion being configured by an application software contents program and application software contents data;

said application software contents program being a program code for a particular process to achieve an objective of said present information processing apparatus and including one or more tasks;

said application software contents data being a set of data to be handled by said application software contents program or said application software engine; and said information processor being to perform an operation process based on an electrical signal from said man-machine interface and software stored in said semiconductor memory, and produce image information and sound information.

2. An information processing apparatus according to claim 1, wherein said information processor having a central processor, a graphics processor and a sound processor, said central processor, graphics processor and sound processor being connected to a common bus to which said semiconductor memory is connected;

said central processor, said graphic processor and said sound processor sharing a memory space in which said semiconductor memory is allocated, and sharing said semiconductor memory as bus masters for accessing said semiconductor memory actively;

said central processor controlling said graphics processor and said sound processor based on said electrical information from said man-machine interface and a program code in said software;

said graphics processor having means to generate image information, and said sound processor having means to generate sound information.

3. An information processing apparatus for outputting video and audio signals to a home TV set, comprising:

a man-machine interface, a semiconductor memory and an information processor;

said man-machine interface converting into an electrical signal one or a plurality of urging force, in-space movement, sound information that are given by a human to said present man-machine interface;

said semiconductor memory storing software for driving said information processor;

said software being configured by an operating system, an information processor hardware driver, a man-machine interface driver, a script language interpreter and an application software contents portion;

said operating system administering at least status control of all the tasks included in the present software, task scheduling, shared resource control between tasks, and interrupt control;

said information processor hardware driver being to efficiently handle a hardware resource in said information processor and configured by a driver program and driver data;

said driver program including totally one or more tasks and subroutines and being to be utilized in function according to task execution or subroutine call from said script language interpreter;

said driver data being a set of data to be handled by said driver program;

said man-machine interface driver being to efficiently deliver said electrical information from said man-machine interface to said script language interpreter and including totally one or more tasks and subroutines, and utilized in function according to task execution or a subroutine call from said script language interpreter;

said script language interpreter being to sequentially interrupt a script language source code to produce and execute an object code interpretable by said information processor;

said application software contents portion being configured by a script language source code and application software contents data;

said script language source code being a program for a particular process to achieve an objective of said present information processing apparatus;

said application software contents data being a set of data to be handled by said script language source code or said script language interpreter; and said information processor being to perform an operation process based on an electrical signal from said man-machine interface and software stored in said semiconductor memory, and producing image information and sound information.

4. An information processing apparatus according to claim 3, wherein said information processor has a central processor, a graphics processor and a sound processor, said central processor, graphics processor and sound processor being connected to a common bus to which said semiconductor memory is connected;

said central processor, said graphics processor and said sound processor sharing a memory space in which said semiconductor memory is allocated, and sharing said semiconductor memory as bus masters for accessing said semiconductor memory actively;

said central processor controlling said graphic processor and said sound processor based on said electrical information from said man-machine interface and a program code in said software;

said graphics processor having means to generate image information; and said sound processor having means to generate sound information.

5. An information processing apparatus according to claim 1 or 2, further comprising communication means capable of transmitting and receiving data and/or a program through a general communication line, wherein said information processor is to perform an operation process based on an electrical signal from said man-machine interface, said software stored in said semiconductor memory and said data and/or program obtained from said communication means.

6. An information processing apparatus according to claim 3 or 4, further comprising communication means capable of transmitting and receiving data and/or a program through a general communication line, wherein said information processor is to perform an operation process based on an electrical signal from said man-machine interface, said software stored in said semiconductor memory data and/or a program obtained from said communication means.

7. An information processing apparatus according to any of claim 1 or 2, wherein said man-machine interface means, said semiconductor memory and said information processor are incorporated in a single apparatus.

8. An information processing apparatus according to any of claim 3 or 4, wherein said man-machine interface means, said semiconductor memory and said information processor are incorporated in a single apparatus.

* * * * *